US012112155B2

(12) United States Patent
Monteiro Vieira et al.

(10) Patent No.: US 12,112,155 B2
(45) Date of Patent: Oct. 8, 2024

(54) SOFTWARE APPLICATION CONTAINER HOSTING

(71) Applicant: KYNDRYL, INC., New York, NY (US)

(72) Inventors: Igor Monteiro Vieira, Hortolandia (BR); Marcelo Mota Manhaes, Curitiba (BR); Thiago Bianchi, São Carlos (BR); Suellen Caroline Da Silva, Mogi Guaçu (BR)

(73) Assignee: Kyndryl, Inc., New York, NY (US)

( * ) Notice: Subject to any disclaimer, the term of this patent is extended or adjusted under 35 U.S.C. 154(b) by 638 days.

(21) Appl. No.: 17/324,335

(22) Filed: May 19, 2021

(65) Prior Publication Data

US 2022/0374218 A1 Nov. 24, 2022

(51) Int. Cl.
*G06F 9/455* (2018.01)
*G06F 8/41* (2018.01)
*G06F 8/61* (2018.01)
*G06F 16/903* (2019.01)
*G06F 21/57* (2013.01)

(52) U.S. Cl.
CPC .............. *G06F 8/63* (2013.01); *G06F 8/433* (2013.01); *G06F 16/90344* (2019.01); *G06F 21/577* (2013.01); *G06F 9/45558* (2013.01); *G06F 2009/4557* (2013.01); *G06F 2009/45587* (2013.01)

(58) Field of Classification Search
CPC ...... G06F 8/63; G06F 8/433; G06F 16/90344; G06F 21/577; G06F 9/45558; G06F 2009/4557; G06F 2009/45587
See application file for complete search history.

(56) References Cited

U.S. PATENT DOCUMENTS

| 2016/0359680 | A1 | 5/2016 | Parandehgheibi et al. |
| 2017/0300697 | A1 | 10/2017 | Iyer et al. |
| 2018/0027009 | A1 | 1/2018 | Santos et al. |
| 2018/0234459 | A1 | 1/2018 | Kung et al. |
| 2018/0046457 | A1 | 2/2018 | Branca |

(Continued)

OTHER PUBLICATIONS

Anonymous, "Method and System for Reducing Deployment of Risk Based Servers in a Production Environment", IP.com No. IPCOM000259977D, Oct. 4, 2019, 5 pgs.

(Continued)

*Primary Examiner* — Dong U Kim
(74) *Attorney, Agent, or Firm* — Dan Housley; Andrew M. Calderon; Calderon Safran & Wright, P.C.

(57) ABSTRACT

Methods, computer program products, and systems are presented. The method computer program products, and systems can include, for instance: examining target application container configuration data to identify one or more target container base image referenced in the target application container configuration: subjecting script data associated to the one or more target container base image to text based processing for evaluation of security risk associated to the one or more container base image, the script data obtained from at least one candidate hosting computing environment; and selecting a hosting computing environment from the at least one computing environment for hosting the target application container, the selecting in dependence on the text based processing.

20 Claims, 14 Drawing Sheets

(56) References Cited

U.S. PATENT DOCUMENTS

| | | | | |
|---|---|---|---|---|
| 2018/0293374 | A1* | 10/2018 | Chen | G06F 9/45558 |
| 2018/0309747 | A1* | 10/2018 | Sweet | G06F 9/45558 |
| 2020/0159933 | A1 | 5/2020 | Ciano et al. | |
| 2020/0304526 | A1* | 9/2020 | Abraham | G06F 9/455 |

OTHER PUBLICATIONS

Valance, J., "Adding Container Security Scanning to Your CircleCI Pipeline with Anchore", ORBS, Nov. 13, 2018. Retrieved on Aug. 18, 2021 from the Internet URL: <https://circleci.com/blog/Adding-container-security-scanning-anchore/>, 8 pgs. On information and belief, and according to the current review, the content of this document was published prior to the filing date of the current application.

"Prove Regulatory Compliance", Aqua. Retrieved on Aug. 18, 2021 from the Internet URL: <https://www.aquasec.com/use-cases/container-auditing-compliance/>, 6 pgs. On information and belief, and according to the current review, the content of this document was published prior to the filing date of the current application.

"Black Duck by Synopsys", retrieved on Aug. 18, 2021 from the Internet URL: <https://blackducksoftware.com>, 3 pgs. On information and belief, and according to the current review, the content of this document was published prior to the filing date of the current application.

"Container Compliance with Sysdig Secure", retrieved on Aug. 18, 2021 from the Internet URL: <https://sysdig.com/products/secure/container-compliance/>, 14 pgs. On information and belief, and according to the current review, the content of this document was published prior to the filing date of the current application.

"Hybrid Cloud Blog", retrieved on Aug. 18, 2021 from the Internet URL: <https://coreos.com/blog/vulnerability-analysis-for-containers/>, 4 pgs. On information and belief, and according to the current review, the content of this document was published prior to the filing date of the current application.

"Mirantis Secure Registry (MSR)", Mirantis Inc. Retrieved on Aug. 18, 2021 from the Internet URL: <https://docs.mirantis.com/containers/v3.0/dockeree-products/msr.html>, 3 pgs. On information and belief, and according to the current review, the content of this document was published prior to the filing date of the current application.

"OpenSCAP Atomic", retrieved on Aug. 18, 2021 from the Internet URL: <https://hub.docker.com/r/openscap/openscap>, 3 pgs. On information and belief, and according to the current review, the content of this document was published prior to the filing date of the current application.

"Neu Vector Full LifeCycle Container Security", retrieved on Aug. 18, 2021 from the Internet URL: <https://neuvector.com/solutions/container-compliance-auditing-solutions/>, 9 pgs. On information and belief, and according to the current review, the content of this document was published prior to the filing date of the current application.

"Istio-IO", retrieved on Aug. 18, 2021 from the Internet URL: <https://istio.io>, 6 pgs. On information and belief, and according to the current review, the content of this document was published prior to the filing date of the current application.

"Snyk.io", retrieved on Aug. 18, 2021 from the Internet URL: <https://snyk.io/>, 12 pgs. On information and belief, and according to the current review, the content of this document was published prior to the filing date of the current application.

"Managing Image Security with Vulnerability Advisor", IBM, Jul. 7, 2021. Retrieved on Aug. 18, 2021 from the Internet URL: <https://cloud.ibm.com/docs/Registry?topic=va-va_index>, 12 pgs. On information and belief, and according to the current review, the content of this document was published prior to the filing date of the current application.

"IBM Portieris", retrieved on Aug. 18, 2021 from the Internet URL: <https://github.com/IBM/portieris>, 7 pgs. On information and belief, and according to the current review, the content of this document was published prior to the filing date of the current application.

Mell, Peter, et al., "The NIST Definition of Cloud Computing", NIST Special Publication 800-145, Sep. 2011, Gaithersburg, MD, 7 pgs.

* cited by examiner

Final Risk Matrix <= 2 Low; => 2.1 <= 3.9 Medium; >=4 High

| Application | Risk Area | Platform | Cloud Provider | Condition Number | Monotonicity Condition | Exploitability | Pervasiveness | Impact | Security Score | Final Risk |
|---|---|---|---|---|---|---|---|---|---|---|
| A | Security Configurations | Container as a Service | A | 1 | 15 out of unnecessary services were allowed 1 out of 8 certificate key stores were stored in an unprotected directory structure | 2 | 3 | 1 | 1.83 | High |
| A | Security Configurations | Container as a Service | A | 1 | 1 out of 8 certificate key stores were stored in an unprotected directory structure | 1 | 1 | 3 | | |
| B | Security Configurations | Container as a Service | B | 1 | 3 out of 3 Base images were allowed to root-namespaces with the Host | 5 | 5 | 5 | 4.83 | Medium |
| B | Identification and Access Management | Container as a Service | B | 1 | 12 out of 12 Base images were misconfigured to allow use of deprecated password protection techniques | 5 | 5 | 4 | | |
| C | Security Configurations | Ubuntu | C | 1 | 1 out of 3 passwords for the privileged account on 1 out of 1 security policy was non-expiring | 1 | 4 | 3 | 7.66 | Low |

FIG. 5

SOFTWARE APPLICATION CONTAINER HOSTING

BACKGROUND

Embodiments herein relate generally to software container based virtualization, and specifically to application software container hosting.

With container-based virtualization, isolation between containers can occur at multiple resources, such as at the filesystem, the network stack subsystem, and one or more namespaces, but not limited thereto. Containers of a container-based virtualization system can share the same running kernel and memory space.

Container based virtualization is significantly different from the traditional hypervisor based virtualization technology involving hypervisor based virtual machines (VMs) characterized by a physical computing node being emulated using a software emulation layer.

Container based virtualization technology offers higher performance and less resource footprint when compared to traditional virtualization and has become an attractive way for cloud vendors to achieve higher density in the datacenter. Thus, containerization (i.e., operating a virtualized data processing environment using container-based virtualization) is changing how workloads are being provisioned on cloud infrastructure.

Data structures have been employed for improving operation of computer systems. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: examining target application container configuration data to identify one or more target container base image referenced in the target application container configuration: subjecting script data associated to the one or more target container base image to text based processing for evaluation of security risk associated to the one or more container base image, the script data obtained from at least one candidate hosting computing environment; and selecting a hosting computing environment from the at least one computing environment for hosting the target application container, the selecting in dependence on the text based processing.

In another aspect, a computer program product can be provided. The computer program product can include a computer readable storage medium readable by one or more processing circuit and storing instructions for execution by one or more processor for performing a method. The method can include, for example: examining target application container configuration data to identify one or more target container base image referenced in the target application container configuration: subjecting script data associated to the one or more target container base image to text based processing for evaluation of security risk associated to the one or more container base image, the script data obtained from at least one candidate hosting computing environment; and selecting a hosting computing environment from the at least one computing environment for hosting the target application container, the selecting in dependence on the text based processing.

In a further aspect, a system can be provided. The system can include, for example a memory. In addition, the system can include one or more processor in communication with the memory. Further, the system can include program instructions executable by the one or more processor via the memory to perform a method. The method can include, for example: examining target application container configuration data to identify one or more target container base image referenced in the target application container configuration: subjecting script data associated to the one or more target container base image to text based processing for evaluation of security risk associated to the one or more container base image, the script data obtained from at least one candidate hosting computing environment; and selecting a hosting computing environment from the at least one computing environment for hosting the target application container, the selecting in dependence on the text based processing.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 5 depicts security score data according to one embodiment;

DETAILED DESCRIPTION

Figure 1:
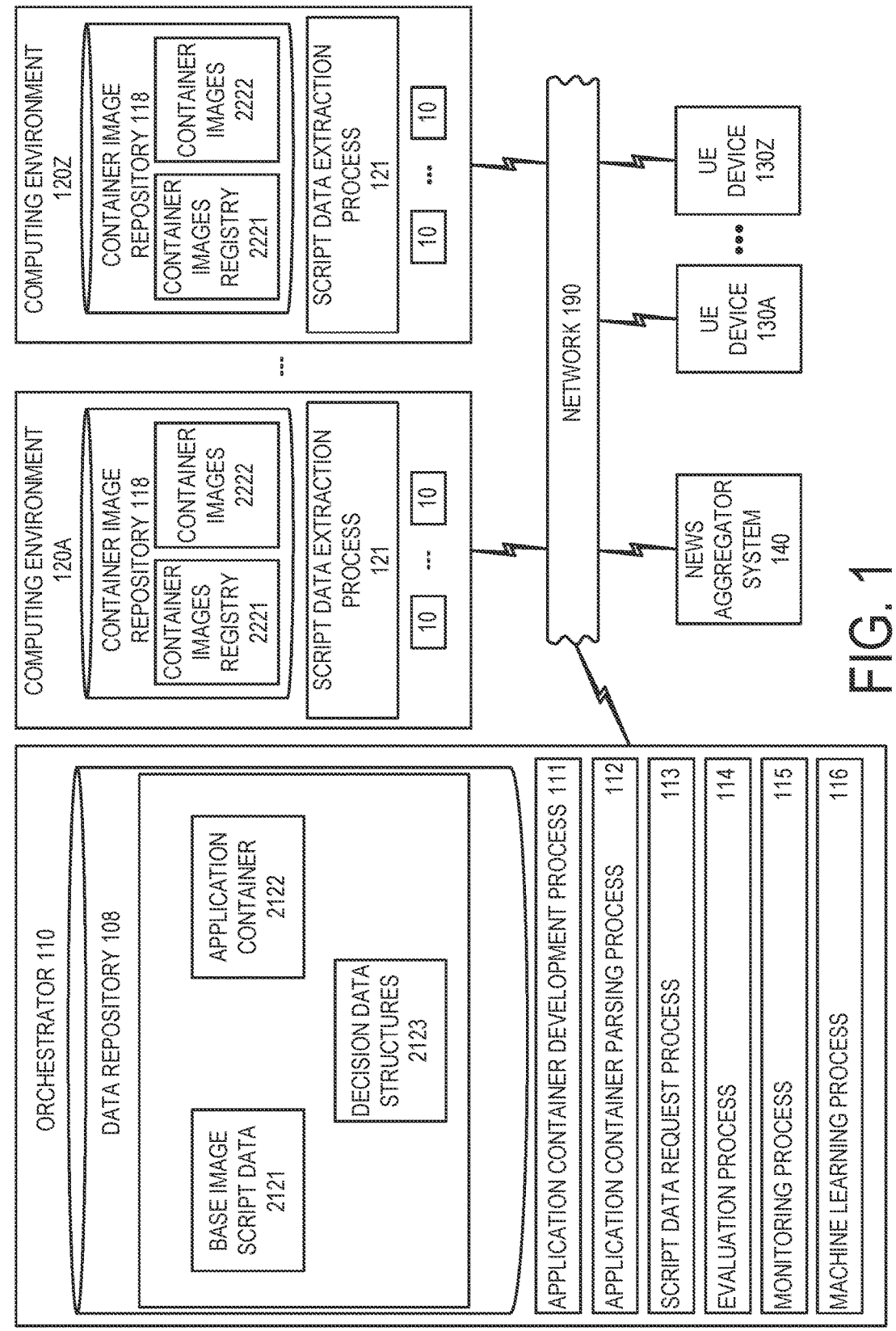
FIG. 1 depicts a system having an orchestrator, a plurality of computing environments, and a plurality of UE devices according to one embodiment.

System 100 for use in testing and running containers as set forth in FIG. 1, in one embodiment, can include orchestrator 110, a plurality of computing environments 120A-120Z, news aggregator system 140, and a plurality of UE devices 130A-130Z in communication with one another via network 190. Network 190 can be a physical network and/or a virtual network. A physical network can be, for example, a physical telecommunications network connecting numerous computing nodes or systems such as computer servers and computer clients. A virtual network can, for example, combine numerous physical networks or parts thereof into a logical virtual network. In another example, numerous virtual networks can be defined over a single physical network.

In one embodiment, orchestrator 110, a plurality of computing environments 120A-120Z, a news aggregator system 140, and a plurality of UE devices 130A-130Z can be external to one another. In one embodiment, one or more of orchestrator 110, a plurality of computing environments 120A-120Z, news aggregator system 140, and a plurality of UE devices 130A-130Z can be co-located.

Embodiments herein recognize that in the building of an application container, a container build file can be authored that references one or more base image. Base images can include an associated function, e.g., operating system translation (modification) function, a web-based user interfacing (web services) function, a database function, a financial transaction payment resolution function, and a limitless range of different functionalities. Embodiments herein also recognize that such base images can be built by a third party, i.e., other than the enterprise that develops an application container that references one or more, and often a plurality of third party developed base images. Base images can be made available in hosting a computing environment referenced herein as a computing environment of computing environments 120A-120Z.

Embodiments herein recognize that developer users who are building application containers can easily overlook security deficiencies in container base images referenced in the application container configuration data. One of the drawbacks with use of third-party developed software is that there can be little understanding of attributes of the third-party software that can pose a security risk. Embodiments herein recognize that security risks can be particularly great when a relied on software module is subject to updates from the third party provider. Embodiments herein recognize that where continuous live services are being provided to end users, there can be essentially no opportunity to stop service delivery for purposes of performing checks on relied on third party software which third party software can be subject to iterative updates.

Embodiments herein recognize that a commonly named container base image having a common name across a wide variety of different computing environments may actually have different software coding attributes defining different configurations across the different computing environments. Thus, different base container images available and hosted on first and second different computing environments can have the same entity name, NAMEDCONTAINER, accordingly to an illustrative example. Embodiments herein recognize that data management and security challenges can arise as a result of different container base images having common entity names across a plurality of computing environments. Embodiments herein recognize that developer users can fail to appreciate differences between commonly named base images hosted on and available from different container hosting computing environments.

For the providing of secure containers, data repository 108 of orchestrator 110 can store various data. In base image script data area 2121, data repository 108 can store script data associated to various base images hosted on and available from respective different computing environments of computing environments 120A-120Z. Computing environments 120A-120Z can store, respectively, a plurality of base images used as building blocks in application containers authored on behalf of an enterprise. Base images can be configured for a particular purpose and can be configured to provide a variety of different functions. For example, a first container base image can be configured to provide an operating system translation function, a second base image can be configured to provide a web-based user interface function, a third base image can be configured to provide a database function, a fourth container base image can be configured to provide a financial transaction resolution function, and so on. Container base images can be configured to provide any arbitrary function. Container base images can be developed by a variety of third-party developers associated with enterprise entities different from the enterprise entity developing an application container that references and uses one or more container base image.

Embodiments herein recognize that differently configured base images associated to a target container base image can be commonly named across different computing environments. A target container base image commonly named across a variety of different computing environments in actuality can be differently configured across different computing embodiments.

Base image script data area 2121 can include script data associated with a plurality of target container base images across different ones of the plurality of computing environments 120A-120Z. Script data herein can include, e.g., text-based script code and/or text-based script comments. Text-based script code can include script commands that define application container build files. Text-based script comments can include text-based data describing attributes of a container base image including respecting attributes of its associated build file. Text-based comment data associated to a container base image can include, e.g., text-based comments associated to a static base image or a running runtime instance of a base image.

In another aspect, base image script data area 2121 can store, in addition to script data, evaluation data resulting from an evaluation of script data associated to various base images. Evaluation data can be in the form, e.g., of result data resulting from application of text-based processing of different sets of base image script data associated to respective different container base images. Text-based scoring processing, in one embodiment, can include identifying the presence of, or absence of, text string keywords in sets of script data. The text string keywords can be security attributes indicating text string keywords.

Application container area 2122 of data repository 108 can include configuration data defining a plurality of application containers. Application containers can be authored by an enterprise for producing an enterprise container-based application. Application container area 2122 can include, e.g., various application container build files for building respective ones of application containers. Application container build files can be run in a computing environment of computing environments 120A-120Z for providing an application container image. An application container image, once built, can be run to define a running runtime instance of an application container. Container build files for building an application container image can include, e.g., build file script code which references previously built container base images. Application container build files can reference one or more previously built container base image. In some embodiments, an application container build file can reference a plurality of previously built container base images.

In some embodiments, configuration data defining an application container can be a script code defining an operational build file for building an application container. In some embodiments, application container configuration data stored in application container area 2122 can include merely a list of target container base images for referencing in an application container that is defined by a developer user. Thus, in some embodiments, application container configuration data can include build files for building an application container image which can then be run to define a running runtime application container. In some embodiments, application container configuration data can be absent of operational build file script code and can include a listing of target container base images that define an enterprise application container. Embodiments herein recognize that for an evaluation of script data for evaluation of an application container, evaluation of configuration data provided by a listing of referenced base images can be sufficient.

Data repository 108 in decision data structures area 2123 can store various decision data structures, including, e.g., decision tables and decision trees for return of action decisions such as action decisions, e.g., to host a target application container, stop and remove a running application container, adjust a hosting sharing ratio of a target application container amongst a set of two or more computing environments, score a container base image, and the like.

For providing secure application containers, orchestrator 110 can run various processes such as application container development process 111, application container parsing process 112, script data request process 113, evaluation process 114, monitoring process 115, and machine learning process 116.

Orchestrator 110 running application container development process 111 can support a developer user in the development of a target application container. Orchestrator 110 running application container development process 111 can provide to a developer user one or more of a text-based development area or a graphics-based development area which in some embodiments can be co-located. The text-based development area can provide the developer user the ability to author script code defining an application container build file which can later be run to define an application container image which image can be run to define a running runtime application container. The graphics-based development area can include various graphics, e.g., indicating available base images available from various computing environments which may be referenced by a developer user within an authored target application container build file or other configuration data.

Orchestrator 110 running application container development process 111 can provide user interface functionality to facilitate the developer user developing application container configuration data that defines a target application container. Configuration data defining a target application container herein can include an application container build file. In one embodiment, a target application container build file can include target application configuration data that specifies a collection of target container base images. Configuration data defining a target application container herein can include a listing of target container base images to be used in a running runtime instance of the target application container.

Orchestrator 110 running application container parsing process 112 can parse configuration data defining the target application container. In one embodiment where configuration data defining the target application container is provided by an application container build file, orchestrator 110 running application container parsing process 112 can include orchestrator 110 parsing the build file for building the target application file to identify therein specialized statements, e.g., commands, which are statements for referencing a container base image within a build file. DOCKER® is a registered trademark of Docker, Inc. Orchestrator 110 running application container parsing process 112 to identify references to container base images within target application container configuration data can additionally or alternatively include orchestrator 110 identifying named entities within text-based configuration data satisfying naming conventions of a container base image. An example of a container build file is shown in Table A.

TABLE A

FROM ubuntu: 16.04
RUN apt-get install jetty
RUN apt-get install tomcat
COPY configfiles /tmp
WORKDIR /path/to/tomcat
CMD ["/bin/bash", "-c", "service start tomcat"]

The application container build file of Table A includes six commands, each of which creates a layer. The FROM statement starts out by creating a layer from the "ubuntu 16.04" container image (alternatively, another FROM statement such as "FROM centos 10.02" would establish an alternative base layer). The container image "ubuntu 16.04" can refer to a layer specific target base image stored on an image repository of computing environments 120A-120Z. The first and second RUN statements install "jetty" and "tomcat" layer specific target container base images of the defined target application container. The COPY command adds files from a local directory. The WORKDIR statement sets a working directory for an ensuing CMD statement, and the CMD statement builds a custom application. The resulting build application container can have the container image structure UBUNTU-JETTY-TOMCAT-CUSTOM CODE. The configuration data defined by the build file can specify the operating system modification base image by UBUNTU® (UBUNTU® is a registered trademark of Canonical Ltd. and LINUX® is a registered trademark of Linus Torvalds), a webservice target container base image by JETTY® (JETTY® is a registered trademark of the Eclipse Foundation), and a development platform target container base image by TOMCAT® (TOMCAT® is a registered trademark of Apache Software Foundation).

Orchestrator 110 running script data request process 113 can include orchestrator 110 sending to respective ones of computing environments 120A-120Z requests for script data associated to respective ones of container base images identified by performance of application container parsing process 112. Orchestrator 110 running script data request process 113 can include orchestrator 110 sending requests for one or more of script code and/or comments associated to respective container base images referenced in the target application container defined by developer user. Orchestrator 110 running evaluating process 114 can include orchestrator 110 evaluating return script data returned from one or more computing environment 120A-120Z. In response to the sending of a script data request by script data request process 113, orchestrator 110 running evaluating process 114 can include orchestrator 110 scoring return script data returned from one or more computing environment of computing environment 120A-120Z. In response to requests for script data, orchestrator 110 running evaluating process 114 can include orchestrator 110 scoring return script data.

Scoring of returned script data can include scoring to provide one or more security risk parameter value. Security risk parameter values can include, e.g., an exploitability security risk parameter value, pervasiveness security risk parameter value and an impact security risk parameter value. Orchestrator 110 running evaluating process 114 can provide an aggregate security risk parameter value score by aggregating security risk parameter values.

Orchestrator 110 running monitoring process 115 can include orchestrator 110 performing monitoring of hosted target application containers which have been hosted in response to performance of evaluating process 114. Orchestrator 110 running monitoring process 115 can include orchestrator 110 iteratively sending script data requests to computing environments 120A-120Z for return of updated script data from computing environments 120A-120Z for respective target container base images referenced within a target application container.

Orchestrator 110, by running monitoring process 115, can receive and process updated script data that is been changed, e.g., due to changed security policies and/or software revisions in respective ones of a plurality of computing environments 120A-120Z. Orchestrator 110 running monitoring process 115 can therefore respond to updates within returned script data. In response to performance of monitoring process 115, orchestrator 110 can return action decisions, e.g., to stop and remove hosted runtime application container, to instantiate the target application container, and/or to adjust an application container hosting sharing ratio between computing environments of computing environments 120A-120Z.

Orchestrator 110 running machine learning process 116 can include orchestrator 110 running machine learning processes to, e.g., (a) learn an association between pass/fail tests run by examination of script data and security events, (b) learn the effect of script dataset attributes on script data security scoring, and to (c) learn text strings in script data that are indicative of security performance.

Computing environments 120A-120Z can include respective container image repositories 118. Container image repositories 118 can include container image registry 2221 and container images area 2222 storing container images. Container image registry 2221 can have an image hash table (IHT). Image registry 2221 can store data descriptive of container images stored in container image area 2222. Container image registry 2221 can store data specifying, e.g., a list of container images stored in container image area 2222, system memory locations of container images stored in container image area 2222, sample container build files and build file commands associated to prior built container image, logs of prior building of container images, and the like. Container images stored in container image area 2222 can include single layer container images and/or multiple layer container images. The IHT of image registry 2221 can be a table that associates container image IDs to container image hash IDs and timestamps for the various container base images.

Respective ones of a plurality of computing environments 120A-120Z can run script data extraction process 121. A computing environment running script data extraction process 121 can extract script data, e.g., text-based script code and/or text-based comments associated to a specified container base image. In a DOCKER® container environment, a computing environment running script data extraction process 121 can include running, e.g., an INSPECT command and/or an EXEC command.

Computing environments 120A-120Z can include computing nodes 10 for hosting runtime application containers. Computing nodes 10 can include, e.g., bare metal machines that directly host one or more runtime application container, and/or can include bare metal machines that run hypervisor based virtual machines for a hosting one or more runtime application container.

Computing environments 120A-120Z ruining script data extraction process 121 can respond to requests for script data received by orchestrator 110 running script data request process 113. In some scenarios, a computing environment running script data extraction process 121 can include computing environment 120 running a runtime instance of a base container image referenced in a script data request. The running of a runtime instance of a base image can make available additional script data for consumption by orchestrator 110 running evaluating process 114. In some scenarios, a computing environment mining script data extraction process 121 can instantiate and run a runtime instance of a base image referenced in a script data request sent by script data request process 113.

Computing environments 120A-120Z of system 100 can be associated to respective computing environment providers. Computing environments of computing environments 120A-120Z can include, e.g., private computing environments and public computing environments which provide multitenancy hosting capabilities. Computing environments of computing environments 120A-120Z can include one or more private computing environment known as, e.g., an internal or enterprise cloud that resides, e.g., on an enterprise's intranet or hosted data center. Alternatively or additionally, computing environments of computing environments 120A-120Z can include one or more shared public computing environment shared by multiple enterprise tenants with use of a multitenancy architecture. According to one embodiment where computing environments 120A-120Z include computing environments configured as public cloud multitenancy computing environments, computing environment providers associated to respective computing environments 140A-140Z can be providers known as public cloud services providers, e.g., IBM® CLOUD® cloud services, AMAZON® WEB SERVICES® (AWS®), or MICROSOFT® AZURE® cloud services (IBM® and IBM CLOUD are registered trademarks of International Business Machines Corporation, AMAZON®, AMAZON WEB SERVICES® and AWS® are registered trademarks of Amazon.com, Inc, and MICROSOFT® and AZURE® are registered trademarks of Microsoft Corporation.). Embodiments herein can be described with reference to differentiated fictitious publicly accessible multitenancy computing environment (e.g., cloud) providers such as CLDA, CLDB, CLDZ.

News aggregator system 140 can be provided by a news aggregator, e.g., a server with appropriate software for aggregating syndicated web content such as online new papers, blogs, and podcasts in a central location for easy access. News aggregator system 140 can include a rich site summary (RSS) synchronized subscription system. RSS uses extensible markup language (XML) to structure pieces of information to be aggregated in a feed reader. Distributed updates can include, e.g., journal tables of contents, podcasts, videos, and news items. News aggregator system 140 can include human selected and entered content as well as automatically selected content, selected with use of auto-selection algorithms. Rich site summary (RSS) feeds can include text and metadata that specifies such information as publishing date and author name.

In one embodiment, each UE device of UE devices 130A-130Z can be associated to a certain developer user. Regarding UE devices 130A-130Z, a UE device of one or more UE device 130A-130Z, in one embodiment, can be a computing node device provided by a client computer, e.g., a mobile device, e.g., a smartphone or tablet, a laptop, smartwatch or PC that runs one or more program, e.g., including a web browser for opening and viewing web pages.

Figure 2:
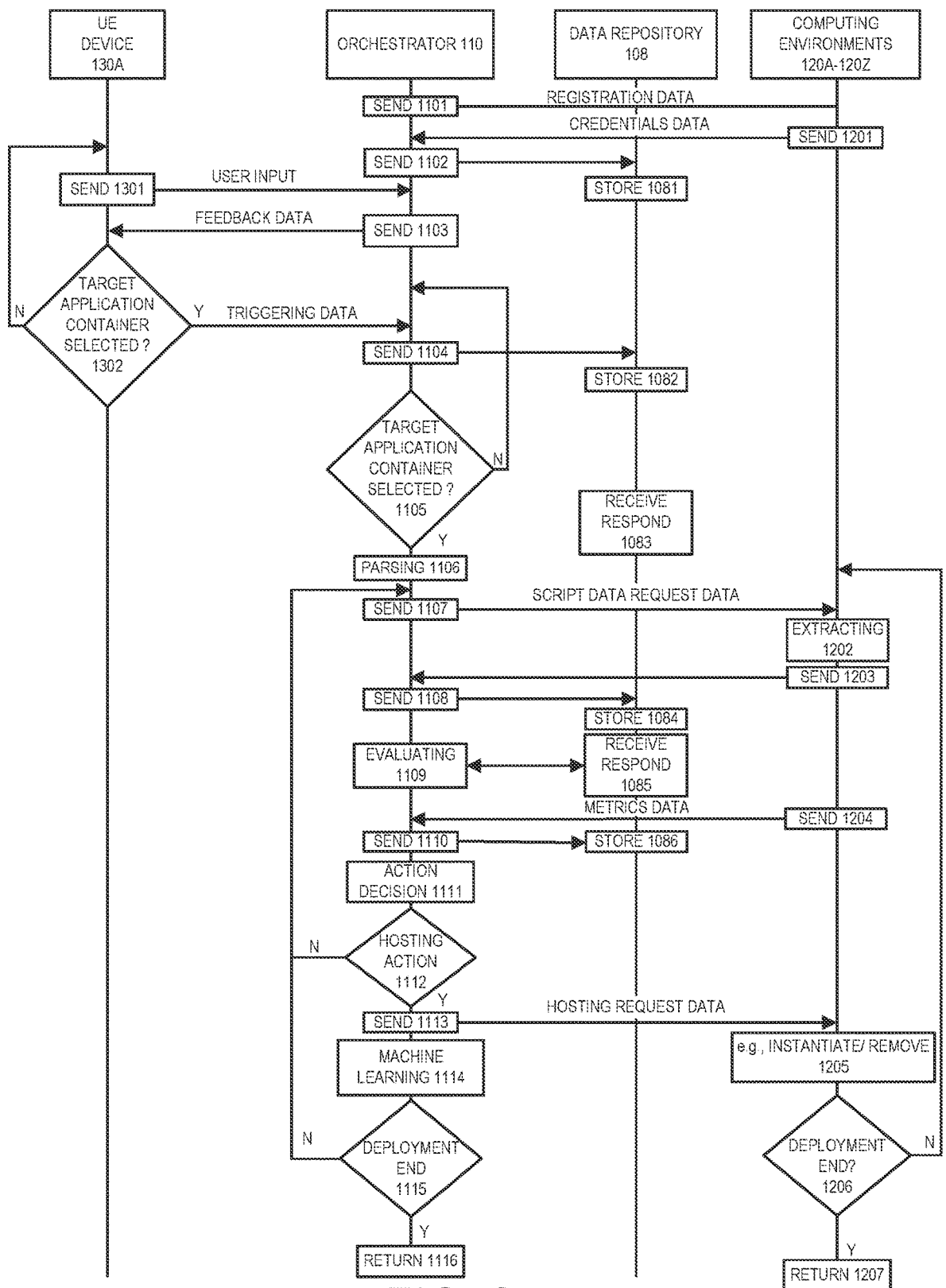
FIG. 2 is a flowchart illustrating a method for performance by an orchestrator interoperating with other components to one embodiment.

A method for performance by orchestrator 110 having data repository 108 interoperating with computing environments 120A-120Z is described with reference to the flowchart of FIG. 2. At block 1101, orchestrator 110 can be sending registration data to a plurality of computing environments 120A-120Z. The registration data can include registration data to register orchestrator 110 as a registered enterprise entity user of computing environments 120A-120Z. Orchestrator 110, according to one embodiment, can be owned, operated, and/or controlled by an enterprise entity that provides an end user service. In another embodiment, orchestrator 110 can be owned, operated, and/or controlled by a broker enterprise entity that provides broker services to an enterprise entity that provides end user services. The brokering service can include brokering the hosting of an application container developed by an enterprise entity providing end user services.

In response to the receipt of the registration data sent at block 1101, computing environments 120A-120Z at block 1201 can send return credentials data to orchestrator 110. Orchestrator 110 in response to the receipt of the credentials data can send, at send block 1102, return credentials data for storage into data repository 108 which can store the credentials data at store block 1081. Credentials data can permit orchestrator 110 to send various requests to computing environments 120A-120Z including script data requests for return of script data associated to container base images referenced in a target application container. Credentials data can also permit orchestrator 110 to send hosting request data to computing environments 120A-120Z. Hosting request data sent to select ones of computing environments 120A-120Z can specify, e.g., instantiating and hosting of an application container or stopping and removing of an application container.

With credentials data returned and stored at block 1201 and block 1081, orchestrator 110 can have the ability to request the execution of certain commands by respective computing environments of computing environments 120A-120Z. Such commands can include commands to run base container images included in respective container image repositories 118 of respective ones of a plurality of computing environments 120A-120Z, commands for extraction of script data including text-based script commands defining container build files, and text-based comment data associated to respective container base images stored in a container image repository 118 of the respective ones of a plurality of computing environments 120A-120Z.

Orchestrator 110 can be configured to support a developer user in the development of target application containers. As noted with respect to application container development process 111, orchestrator 110 can provide a development environment that facilitates the development of application containers with use of a web-based user interface. Orchestrator 110 can provide text and/or graphical user interface for display on a display of UE device 130A that permits development of application container configuration data defining a target application container that references one or more target container base image.

At block 1301, UE device 130A can send developer user defined user input data to orchestrator 110, and at block 1103, orchestrator 110 can responsively send feedback data for receipt by UE device 130A. The feedback data sent at block 1103 can depict the state of a provisionally defined application container. Feedback data can include, e.g., presented and visually displayed text-based script code defining an application container build file and/or graphical data depicting a set of selected base images that define a target application container. At block 1302 UE device 130A can determine whether a target application container has been selected. The development aiding user interface provided to a developer user by orchestrator 110 can include, e.g., a select control, e.g., select button that allows the developer user to indicate selection of a target application container. A target application container can be an application container for subjecting to evaluation by evaluation process 114 explained in reference to FIG. 1, and in some use cases, hosting by one or more computing environment of computing environments 120A-120Z. A target application container can reference one or more target container base image. A target container base image can have a common name across multiple computing environments but can be differently configured between different respective computing environments.

UE device 130A can iteratively perform the loop of blocks 1301 and 1302 until a developer user indicates the selection of the target application container. When a target application container has been designated, UE device 130A at block 1302 can send triggering data to orchestrator 110 indicating the selection of a target application container. In response to the triggering data, orchestrator 110 at block 1104 can send configuration data defining the target application container for storage in data repository 108, which can store the configuration data defining the target application container at store block 1082. With the storage of data specifying a target application data, there can be stored references to target container base images referenced in the target application container.

At block 1105, orchestrator 110 can determine whether triggering data specifying the selection of a target application container has been received and can iteratively perform block 1105 until such triggering data has been received. On the determination at block 1105 that a target application container has been selected by the receipt of triggering data, orchestrator 110 at block 1105 can proceed to block 1106.

At block 1106, orchestrator 110 running application container parsing process 112 can perform parsing at block 1106 to identify container base images that are referenced within a target application container. Parsing at block 1106 can include identification of script code statements referencing a container base image. In DOCKER®, the relevant base image referencing statement can be, e.g., the FROM statement and/or the RUN statement as described in connection with Table A. Orchestrator 110 additionally or alternatively at parsing block 1106 can identify entity names within text-based configuration data that satisfy container base image naming convention. Orchestrator 110 performing parsing at block 1105 can include orchestrator 110 performing iterative queries on data repository 108 storing target application container configuration data for the relevant target application container selected by a developer user at block 1302. Data repository 108 can iteratively respond to such data queries at receive and respond block 1083.

On completion of parsing block 1106, orchestrator 110 can proceed to block 1107. At block 1107, orchestrator 110 can send script data request data for receipt by one or more computing environment of computing environments 120A-120Z. At block 1107, according to one embodiment, orchestrator 110 can send script data request data for receipt by respective ones of computing environments 120A-120Z. Orchestrator 110 sending script data request data at block 1107 can include orchestrator 110 sending script data request data for return of script data respecting each identified container base image of a target application container identified at parsing block 1106. Thus, the script data request data sent at block 1106 can include script data request data associated to one or alternatively, a plurality of identified container base images. The script data request data can include requests for one or more of text-based script code and/or text-based comments associated to an identified container base image identified by performance of parsing block 1106. The sending of script data request data at block 1107 in a DOCKER® container environment can include the sending of one or more of a DOCKER® INPECT or DOCKER® EXEC command.

Computing environments 120A-120Z running script data extraction process 121 can perform script data extracting at extracting block 1202. Performing script data extracting at extracting block 1202 can include responding to sent commands defined by script data request data sent at block 1107. In a DOCKER® container environment, extracting at block 1202 can include execution of certain received commands received from orchestrator 110 for execution such as INSPECT and/or EXEC.

In performing extracting at block 1202, computing environments 120A-120Z can extract script data for sending to orchestrator 110 at block 1203. The extracting of script data extracted at block 1202 can include in some scenarios instantiating a runtime instance of one or more container base image for extraction of additional script data. In some scenarios, extracting at block 1202 can include extracting script code defining the base image build file. Performing extracting at extracting block 1202 can include extracting text-based comments associated to a container base image. Returned script data can include text-based comments and can include developer comments by a developer enterprise entity of a base image specifying attributes of a container base image referenced in a target application container selected at block 1302. Returned script data associated to a base image can include text-based comments and can include host enterprise entity comments of the enterprise entity that owns, operates, and/or controls the computing environment of computing environments 120A-120Z on which the base image is hosted.

On completion of extracting at block 1202, computing environments 120A-120Z can proceed to block 1203. At block 1203, computing environments 120A-120Z can send extracted script data to orchestrator 110. On receipt of the script data sent at block 1203 by the respective computing environments of computing environments 120A-120Z, orchestrator 110 can proceed to block 1108. At block 1108, orchestrator 110 can send for storage into data repository 108 the received script data received in response to the sending at block 1203. In response to the receipt of script data sent at block 1203, orchestrator 110 at block 1108 can send received script data to data repository 108 for storage at script data storage block 1084. In one aspect, the received script data received in response to send block 1203 can be returned in a plurality of different script datasets which can be classified into a plurality of different script data classifications.

When orchestrator 110 stores returned script data at store block 1084 by data repository 108, orchestrator 110 can store the script data so that script data associated to differently configured base images is associated to respectively different container base images even where the different container base images are associated to a commonly named target container base image. Embodiments herein recognize that in a container hosting environment, different computing environments can make available different base images that are differently configured amongst computing environments, and yet are commonly named between different computing environments. For example, the operating system translation container base image UBUNTU 21.04 can have a common name between computing environment 120A and computing environment 120B, and yet the container base image commonly named UBUNTU 21.04 in both computer environment 120A and computing environment 120B can have a different configuration between computing environment 120A and computing environment 120B. Embodiments herein recognize that the different configurations for a target container base image commonly named between computing environments can be attributable, e.g., to different security policies between the computing environments. For example, a second computing environment can have a requirement for file system encryption whereas a first computing environment can be absent of such a requirement and so commonly named base images of the first and second computing environments can have different configurations (one with file system encryption and one without).

At block 1107, for sending script data request data, orchestrator 110 can, in one embodiment, send common script data request data to multiple computing environments of computing environments 120A-120Z, i.e., referencing commonly named target container base images of a selected target application container. However, because the commonly named container base images can be differently configured as a result of being hosted on different computing environments, return script data returned from the various computing environments can be differentiated. In one illustrative use case, a target application container selected at block 1301 and 1302 can be a payment card industry (PCI) application that references four target container base images (fictitious herein for purposes of illustration), an operating system translation function base image OSTRAN, a web-based user interfacing function base image UIWEB, a database function base image DB STORE, and a financial transaction resolution function base image, FINTRAN. The above illustrative target container base images can have common names between computing environments but differentiated configurations between computing environments.

Orchestrator 110 at send block 1107 can send common script data requests referencing a target container base image commonly named between computing environments but differently configured between computing environments. Embodiments herein recognize that the various computing environments of computing environments 120A-120Z may respond to the common script data requests sent at block 1107 differently due to the different configurations of the commonly named base image between computing environments 120A-120Z. Embodiments herein recognize that commonly named container base images commonly named between different computing environments can have different configurations attributable, e.g., to different security policies between computing environments. For example, a first computing environment can have a file encryption requirement for a target container base image and the second computing environment can be absent of such a requirement.

naming as base images are updated within a computing environment and can facilitate detection of a base image update, e.g., by scanning for matching base image names in data repository 102. If a base image is updated, its hash will be changed, and therefore its name will be changed, and there will be no prior matching name for the base image in data repository 108.

At store block 1084, orchestrator 110 can store return script data from multiple different computing environments in the manner described with reference to Table B.

TABLE B (Return script data and scoring)

| Row | Application container ID | Target container base image common name | Base image unique name | Script1 | Script2 | Security scores (exploitability, pervasiveness, impact) | Time stamp |
|---|---|---|---|---|---|---|---|
| 1 | A001 | OSTRAN | OSTRAN_CLDA_[hashA.1] | XX | XX | (xx, xx, xx), (xx, xx, xx) | XX |
| 2 | A001 | UIWEB | UIWEB_CLDA_[hashA.1] | XX | XX | (xx, xx, xx), (xx, xx, xx) | XX |
| 3 | A001 | DBSTORE | DBSTORE_CLDA_ [hashA.1] | XX | XX | (xx, xx, xx), (xx, xx, xx) | XX |
| 4 | A001 | FINTRAN | FINTRAN_CLDA_[hashA.1] | XX | XX | (xx, xx, xx), (xx, xx, xx) | XX |
| 5 | A001 | OSTRAN | OSTRAN_CLDB_ [hashB.1] | XX | XX | (xx, xx, xx), (xx, xx, xx) | XX |
| 6 | A001 | UIWEB | UIWEB_CLDB_[hashB.1] | XX | XX | (xx, xx, xx), (xx, xx, xx) | XX |
| 7 | A001 | DBSTORE | DBSTORE_CLDB_[hashB.1] | XX | XX | (xx, xx, xx), (xx, xx, xx) | XX |
| 8 | A001 | FINTRAN | FINTRAN_CLDB_ [hashB.1] | XX | XX | (xx, xx, xx), (xx, xx, xx) | XX |
| 9 | A001 | OSTRAN | OSTRAN_CLDZ_[hashC.1] | XX | XX | (xx, xx, xx), (xx, xx, xx) | XX |
| 10 | A001 | UIWEB | UIWEB_CLDZ_[hashC.1] | XX | XX | (xx, xx, xx), (xx, xx, xx) | XX |
| 11 | A001 | DBSTORE | DBSTORE_CLDZ_[hashC.1] | XX | XX | (xx, xx, xx), (xx, xx, xx) | XX |
| 12 | A001 | FINTRAN | FINTRAN_CLDZ_[hashC.1] | XX | XX | (xx, xx, xx), (xx, xx, xx) | XX |
| 13 | A001 | | | | | Aggregate security score, CLDA: XX | XX |
| 14 | A001 | | | | | Aggregate security score, CLDB: XX | XX |
| 15 | A001 | | | | | Aggregate security score, CLDZ: XX | XX |

Because commonly named container base images can have different configurations between computing environments, the respective return extracted script data extracted by extracting block 1202 can have correspondingly different attributes so that at store block 1084, orchestrator 110 can store script data that is differentiated between different computing environment configurations of a target container base image commonly named between computing environments.

Orchestrator 110 for differentiating between the differently configured but commonly named base images can, for purposes of data organization and control management, provide extensions, e.g., prefixes and/or suffixes to the various base image names when storing base image associated script data into data repository 108. A first extension can specify the computing environment hosting the specific container base image. A second extension can specify a hash of the base image according to its specific configuration on a particular computing environment. Providing a name extension using a base image hash can facilitate accurate For data organization and management, orchestrator 110 can assign a commonly named target container base image referenced in a target application container a unique name in dependence on its associated computing environment and update iteration. Embodiments herein recognize that there can be multiple update iterations between "version" releases of a base container. Referring to Table B, an assigned unique identifier to identify the certain container base image can include a name extension so that a certain base container image from a certain computing environment of computing environments 120A-120Z is differentiated from the remaining computing environments of computing environments 120A-120Z. In base image script data area 2121, each target container base image having a common name between computing environments can be given a unique name for each computing environment instance where the commonly named container base image commonly named between computing environments is in fact differently configured between the various computing environments. Accordingly, orchestrator 110 can be configured to track different evaluations (including scoring) of a target container base image commonly named between computing environments where the commonly named container base image can be configured differently between computing environments. In one embodiment, as indicated in Table B, the base image name extension for differentiating between different configurations of the commonly named container base image can be provided by calculating a hash of the container base image specific to a certain computing environment and attaching the hash as a name extension to the container base image common name.

Referring to one specific use case, a target application container selected at block 1301 and 1302 can be a payment card industry (PCI) application container for performing PCI functions. As indicated in Table B, the target application container can include (a) an operating system translation target container base image, OSTRAN, a web user interfacing target container base image, UIWEB, a target container base image for holding encrypted account data, DBSTORE, and financial transaction executing target container base image, FINTRAN. A developer user at block 1301 can provision the described illustrative application container referencing the described target container base images, which can have different configurations in their respective different hosting computing environments. Further in the described scenario, orchestrator 110 at send block 1107 can send script data request data to three computing environments, 120A, 120B, 120Z, which can have respective computing environment IDs, CLDA, CLDB, CLDZ.

In the described scenario, computing environments 120A-120Z at send block 1203 can send to orchestrator 110 returned script data as described in connection with Table B. The returned script data can be returned for each of the four container base images OSTAN, UIWEB, DBSTORE, FINTRAN for the three respective computing environments identified for computing environments having respective computing environment IDs, CLDA, CLDB, CLDZ. In base image script data area 2121 of data repository 108, as indicated in Table B, the four container base images OSTAN, UIWEB, DBSTORE, FINTRAN for the designated application container having ID A001 are provided with different names for the three computing environments 120A, 120B, 120Z based on the fact that commonly named container base images have unique configurations across the different first, second, and third different computing environments 120A, 120B, 120Z.

Configuring orchestrator 110 to associate returned script data returned for a target container base image to uniquely named container base images that are uniquely named based on the computing environment permits orchestrator 110 to return meaningful performance evaluations across different computing environments. For example, due to being differently configured, e.g., one with an encryption requirement and one without, a commonly named target container base image running on a first computing environment can pose greater security risk than a second configuration of the commonly named container base image running in a second computing environment. Orchestrator 110 by features herein can differentiate between security risks posed by different configurations of a target container base image of a target application container that is differently configured but commonly named between computing environments.

On completion of block 1108, orchestrator 110 can proceed to evaluating block 1109 to perform evaluating of the various returned script data returned at send block 1203. Evaluating at block 1109 can include text-based processing to identify the presence of and/or absence of specified text strings within returned script data. Embodiments herein recognize that text content of script data, e.g., text-based script code or text-based comments can reveal security-related attributes of an associated container base image. For example, the inclusion of a specified text string, e.g., set of one or more keywords, can indicate the performance of a certain specified security-related operation. Likewise, the absence of a certain text string can indicate nonperformance of the certain security-related operation. At evaluating block 1109, orchestrator 110 can perform text-based processing to score script data and, in particular, can assign a security score to returned script data. Scoring of a script dataset comprising script data can include (1) subjecting the script dataset to text string detection processing to identify the presence or absence of one or more text string and assigning a pass/fail result to the script dataset; (b) transforming the binary pass/fail result into a plurality of qualitative parameter values, and (c) aggregating the plurality of parameter values into a security score for the script dataset. For scoring a base image, security scores for multiple script datasets can be aggregated. For scoring an application container, security scores for a plurality of target container base images defining a target application container can be aggregated. Evaluating can comprise multiple queries of data repository 108, as is indicated by receive/respond block 1085 of data repository 108. Further aspects of evaluating script data are described with reference to the flowchart of FIGS. 4A-4B and the flowchart of FIG. 7A.

Returned script data returned by computing environments 120A-120Z at block 1203 can be returned in different script datasets having different classifications of script data. With use of script data request data sent at block 1107, orchestrator 110 can obtain script data from respective ones of computing environments in multiple datasets having multiple different script data classifications. Referring to block 7002 of FIG. 7A, returned script data datasets are shown as being returned in ten different script datasets having ten different classifications, e.g., discretionary access control (DAC), open system resources (OSR), protocols, security policy context, build pipelines, source deploy location, source image, target deploy location, target image, and monotonic policy. Some returned script data can be returned by querying of static sources such as static base image configuration data provided e.g., by a base image build file, a static base image (in a prior to runtime state), comment data associated to a base image build file, or base image. Some returned text-based script data can be returned by querying a running runtime instance of a target container base image, e.g., under the classification, "build pipelines" depicted in FIG. 7A.

Figure 7A:
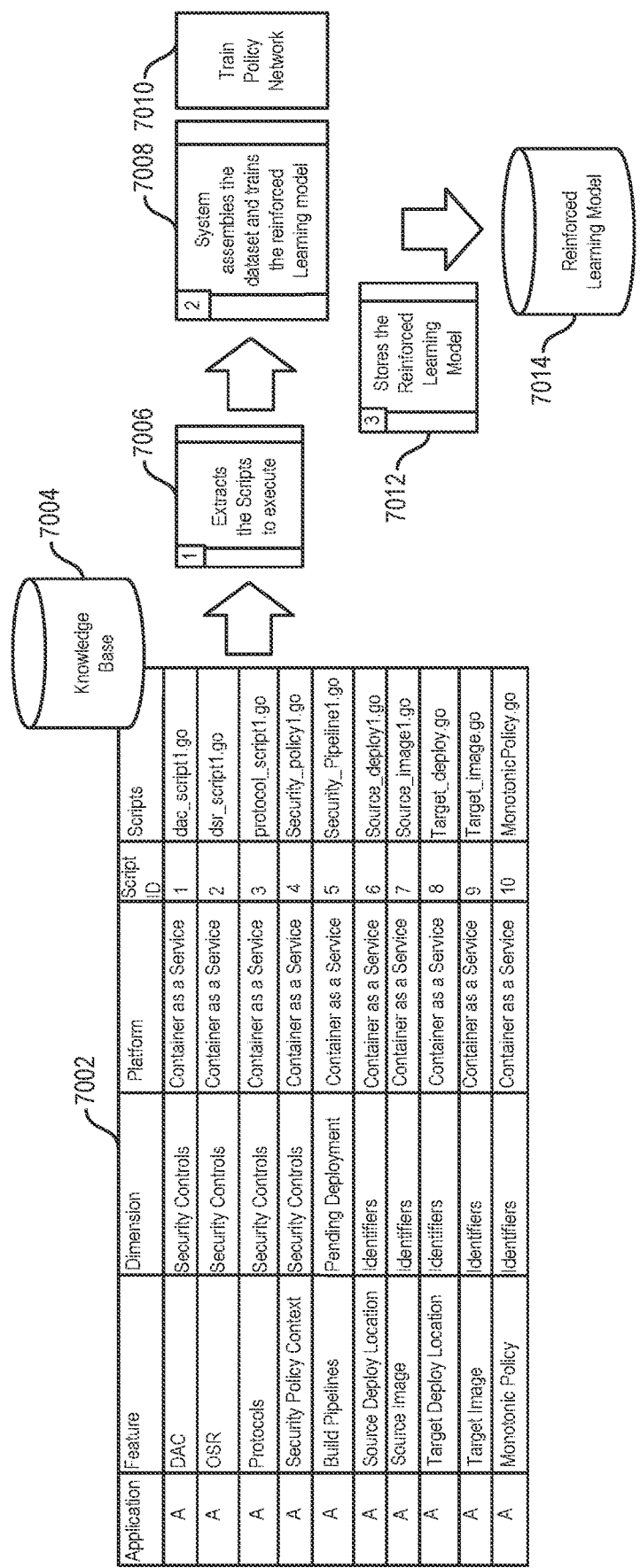
FIGS. 7A-7B depict flowcharts illustrating operation of an orchestrator according to one embodiment.

Orchestrator 110 can subject each returned script data dataset, e.g., as shown in FIG. 7A, to text-based processing for identification of a security attribute indicating text strings. For identification of text strings indicating a positive security attribute or negative security attribute, orchestrator 110 can subject returned script data in various returned script data datasets, e.g., as shown in FIG. 7A, to pass/fail tests in which the presence or alternatively, the absence of the specified one or more text string can be detected. Various exemplary text string detection-based pass/fail tests are listed in block 4002 and block 4004 of the flowchart of FIGS. 4A and 4B. A developer user designing evaluation process 114 running on orchestrator 110 can consult reference source materials for identification of a variety of pass/fail tests that are performed by way of detection of the presence or absence specified by one or more text strings within the script data. Examples of reference source materials in which text string detection-based pass/fail tests are specified include software testing reference source authority materials of the Common Vulnerability Scoring System (CVSS), Center of Internet Security (CIS), and MITRE®. MITRE® is a registered trademark of The Mitre Corporation.

As shown in FIG. 7A, some of the pass/fail tests can be performed with respect to static base image data, e.g., build files, text-based comments on build files, static base images in a prior to runtime state, and text-based comments to such static base images. Some of the pass/fail tests, on the other hand, as indicated by block 4004 of FIG. 4A, can be performed with respect to script data associated to a running runtime instance of a target base image in a runtime state, e.g., the classification "build pipelines," as shown in Table 7A.

Figure 4A:
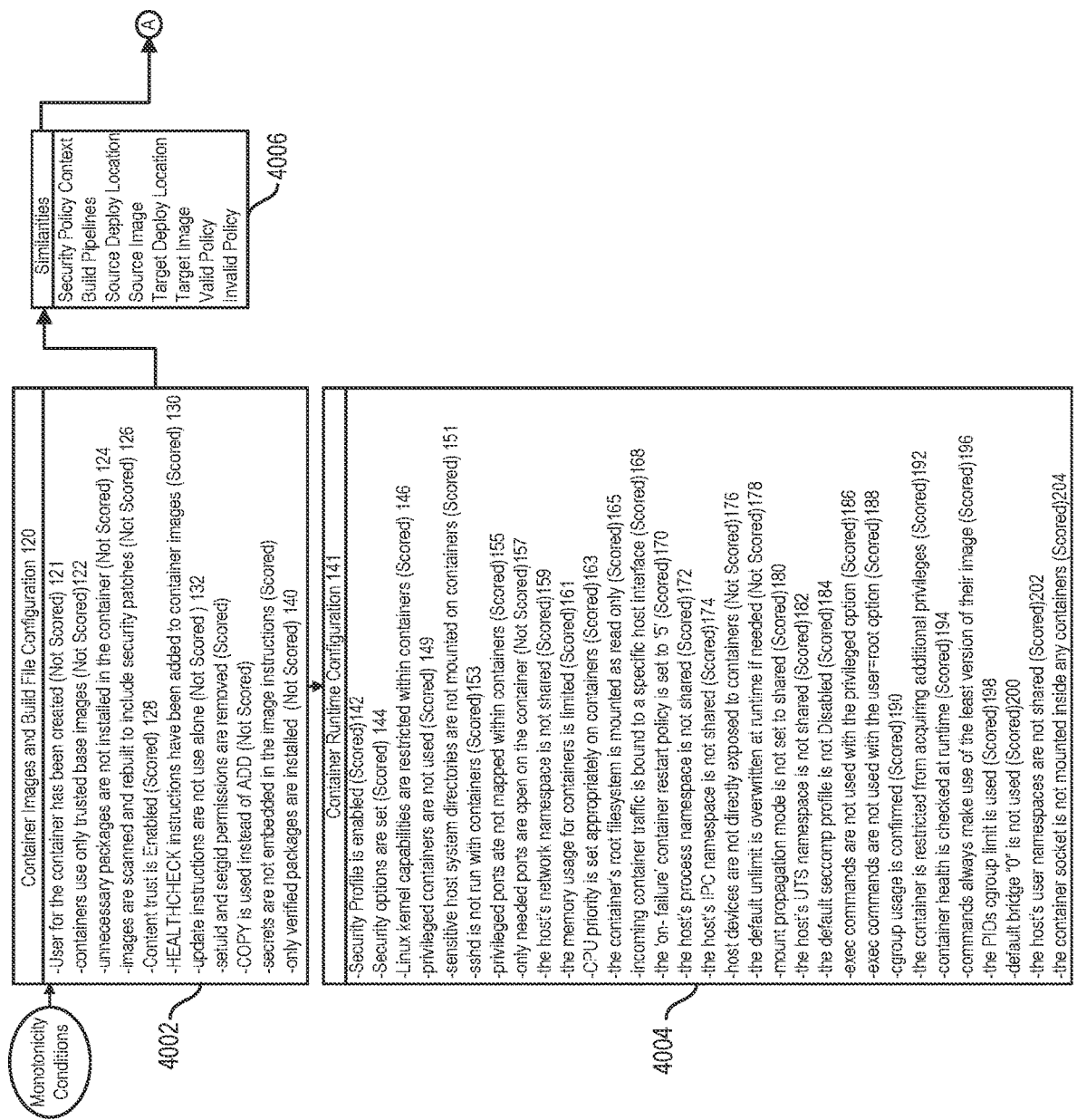
FIG. 4A-4B is a flowchart illustrating a method for performance by an orchestrator interoperating with other components according to one embodiment.
Figure 4B:
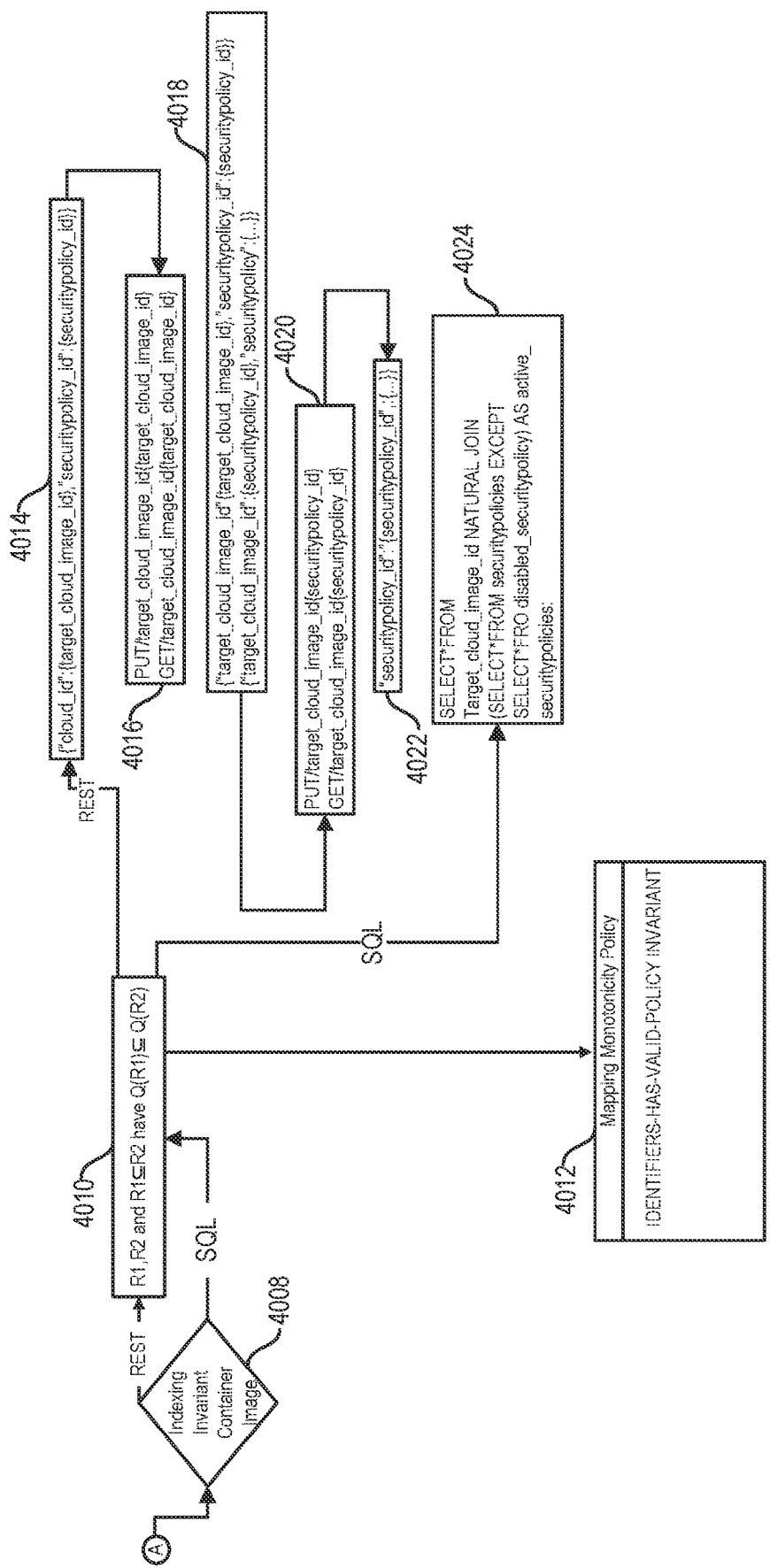

Various software tests for running on returned script data datasets are referenced at block 4002 and 4004 of the flowchart of FIG. 4A. In FIGS. 4A-4B, in reference to blocks 4002, 4004, 4006, 4008, 4010, 4012, 4014, 4016, 4018, 4020, 4022, 4024, there is set forth a method in which tests are performed on script data for return of security scoring. The depicted tests can be pass/fail tests, referenced from a test source authority. According to one aspect, orchestrator 110 at evaluating block 1109 can transform binary pass/fail results into quantitative results for output of a plurality of different security parameter values, e.g., an exploitability parameter value, a prevalence parameter value, and an impact parameter value.

Orchestrator 110 can transform binary pass/fail result data into security parameter values using a plurality of alternative methodologies. According to one embodiment, orchestrator 110 can interpolate the pass/fail test result into a qualitative security scoring value in first, second, and third parameter value classifications, e.g., exploitability, pervasiveness, and impact. For return of an exploitability parameter value, orchestrator 110 can discover an exploitability level associated to a security pass/fail test is. For return of an exploitability parameter value based on pass/fail result data, orchestrator 1110 can be configured to iteratively, e.g., at machine learning block 1114 of FIG. 2, query news aggregator system 140 using text data specifying a pass/fail test to ascertain and discover the exploitability level of the security risk associated to the pass/fail test.

Embodiments herein recognize that when there is a security risk that is highly exploitable, online literature can be expected to accumulate describing the security risk. Online materials can be found, e.g., in security related publications, enterprise websites and online blogs. News aggregator system 140 can be configured to aggregate text-based literature relating to security risks, and orchestrator 110 at machine learning block 1114 can query news aggregator system 140 for updates to a decision data structure stored in data repository 108 that associates online query determined exploitability ratings to pass/fail tests. Orchestrator 110 can determine exploitability ratings for each listed security risk associated to the various online tests based on the frequency of documents within news aggregator system 140 specifying the security risk associated to the certain pass/fail tests. Orchestrator 110 for transforming a pass/fail result associated to a certain pass/fail test into a qualitative exploitability score can bias a pass/fail result according to an updated and most recent exploitability rating for the certain pass/fail test specified in the described decision data structure stored in data repository 108 that associates online query determined exploitability ratings to pass/fail tests executed by orchestrator 110.

For transforming a pass/fail test result into a pervasiveness security score, orchestrator 110 can examine pass/fail result data accumulated from examination of script data received from a plurality of computing environments 120A-120Z. Orchestrator 110 for transformation of a pass/fail result into a quantitative pervasiveness security parameter value can assign higher than baseline pervasiveness parameter value scores where the pass/fail test has a higher than baseline failure percentage across multiple computing environments and can assign lower than baseline pervasiveness parameter values in the case that a pass/fail test has a lower than baseline failure frequency across a plurality of computing environments 120A-120Z. Orchestrator 110 in decision data structures area 2123 can store a decision data structure updated at machine learning block 1114 which associates pass/fail tests performed by orchestrator 110 with failure frequency based pervasiveness ratings for the pass/fail tests. Orchestrator 110 for transforming a pass/fail result associated to a certain pass/fail test into a qualitative pervasiveness parameter value score can bias a pass/fail result according to an updated and most recent pervasiveness rating for the certain pass/fail test specified in the described decision data structure stored in data repository 108 that associates failure frequency-based pervasiveness ratings to a list of pass/fail tests.

Figure 3A:
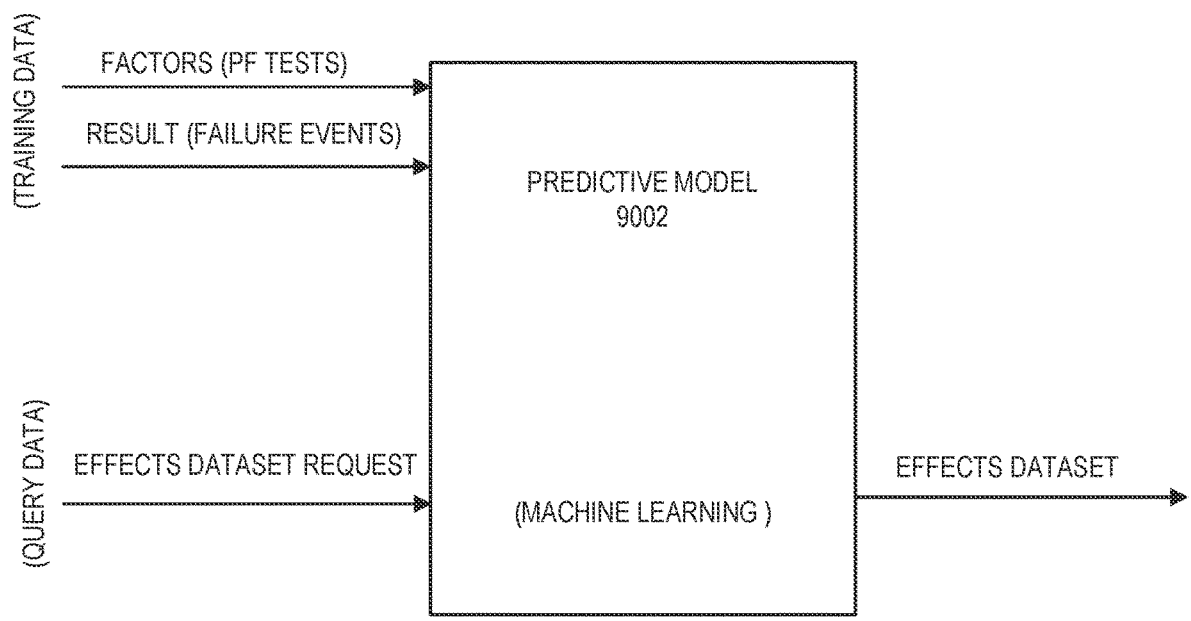
FIGS. 3A-3C depict predictive models according to one embodiment.

For transformation of pass/fail results into qualitative impact parameter values, orchestrator 110 can maintain a historical record of performance failures with reference to a certain base image and can perform machine learning processes to derive an iteratively updated measurement of the impact of each respective pass/fail test in respect to the performance failure. In one embodiment, orchestrator 110 can be configured to perform mixed effect analysis using predictive model 9002 as shown in FIG. 3A configured as a mixed effect solver. Predictive model 9002 configured as a mixed effect solver can be configured to learn the "effect" (impact) of various inputs on the specified effect. According to one aspect, orchestrator 110 for most recent container event failures during iterations of machine learning block 1114 can update training data for predictive model 9002 configured as a mixed effect solver based on most recent failure event data specified within metrics data stored at block 1086 in order to update the determined effect (impact) scores pertaining to various pass/fail tests have on the detected failure. The most recent security failure event specified by stored metrics data stored at block 1086 can be added to a list of failure events, and each failure event can be expressed as a function of a set of factors provided by the set of pass/fail tests (candidate effects). Orchestrator 110 can solve the set of equations to output for each factor (each pass/fail test) an updated effect score (impact) for the factor. Orchestrator 110 in decision data structures area 2123 can store a decision data structure updated at block 1113 which associates pass fail results (factors) performed by orchestrator 110 to "effect" (impact) ratings for the pass/fail tests. Orchestrator 110 for transforming a pass/fail result associated to a certain pass/fail test into a qualitative impact parameter value score can bias a pass/fail result according to an updated and most recent "effect" rating for the certain pass/fail test updated through use of mixed effect analysis machine learning.

After orchestrator 110 transforms a pass/fail score for a script dataset into multiple security parameter values (e.g., exploitability, pervasiveness, impact), orchestrator 110 can aggregate the parameter values for return of a script dataset security score. Orchestrator 110 can aggregate security scores returned from examining script datasets returned for a certain target container base image for return of a target container base image security score, and orchestrator 110 can aggregate security scores for target container base images of a target application container for return of a target application container security score. Aggregating herein can include, e.g., providing an aggregate function (weighted or unweighted), e.g., an average, count, maximum, median, minimum, mode, range, sum, and the like.

Orchestrator 110 performing evaluating at block 1109 can include orchestrator performing text-based processing to identify the presence of text strings, e.g. a set of one or more keyword, or an absence of a text string within obtained script data. In some scenarios, the presence or absence of a text string can refer to an absolute presence or absence of a text string. In some scenarios, the presence or absence of a text string can refer to a term frequency above a high threshold (presence) or below a low threshold (absence).

According to a scoring formula in one embodiment, scoring can be provided so that a higher score indicates relatively stronger security and lower security risk, whereas a lower score indicates relatively weaker security and higher security risk. There can be text strings which, if included in script data, drive a script data score upward (indicative of stronger security and lower risk) and there can be text strings that can drive the security score lower (indicative of weaker security and greater risk). There can also be text strings, the absence of which can drive the security score higher (indicative of stronger security) and there can also be text strings the absence of which can drive a security score lower (indicative of greater risk) printed.

Orchestrator 110 at evaluating block 1109, in accordance with running of evaluation process 114, can return security scores for a given target application container (A001 as shown in Table B) across multiple different computing environments. In the described scenario of a PCI target application container described with reference to Table B, there can be for respective target container base images referenced in a target application container, an evaluation performed across three computing environments, one evaluation for each different configuration of the respective target container base images referenced in a target application container.

At evaluating block 1109, orchestrator 110 for scoring a target container base image can aggregate scores attributable to different script datasets defining script data for the target container base image. In general, there can be one to J script datasets. For example, in Table B, there are tabulated security scores for first and second script datasets, script1 and script2. In the example of FIG. 7A, there are shown ten script datasets defining script data. Aggregating herein can include, e.g., providing an aggregate function (weighted or unweighted), e.g., an average, count, maximum, median, minimum, mode, range, sum, and the like. At evaluating block 1109, orchestrator 110 for scoring a target application container can aggregate scores attributable to different target container base images which make up a target application container. In Table B, there are tabulated aggregate security scores for target application container A001 with respect to computing environment 120A, computing environment 120B, and computing environment 120Z.

On completion of evaluating block 1109 to return security scores for a plurality of target container base images and for a plurality of configurations of applicant containers (the different configurations associated to different computing environments), orchestrator 110 can proceed to action decision block 1111. At block 1111, orchestrator 110 can perform an action decision to select a computing environment for hosting the target application container selected at blocks 1301 and 1302. The action decision at block 1111 can include selecting the candidate application container returning the highest aggregate security score and posing the lowest security risk out of the candidate application containers (associated to different computing environments) evaluated at block 1109. As indicated by Table A, single target application container determined selected at blocks 1301 and 1302 can result in three configurations of the target application container being evaluated, i.e., one configuration for each respective computing environment to which script data request data was sent at block 1107. The different configurations of the target application container can be differentiated and can have different configurations by reason of their having differentiated container base images configured differently in dependence on the particular computing environment for hosting the target application container. In some use cases, selecting of a hosting computing environment can include evaluation of a single candidate computing environment, which can be selected for hosting a target application container on the determination at block 1111 based on evaluating at block 1109 that the computing environment has a threshold satisfying security performance level.

Orchestrator 110 at evaluating block 1109 can aggregate security scores for each classification of script data and for each container base image referenced in a target application container. If the target application container being evaluated has not yet been hosted, orchestrator 110 on completion of block 1109 can proceed to action decision bock 1111. If the target application container being evaluated has been hosted, orchestrator 110 on completion of block 1109 can receive metrics data sent at block 1204 and can store such metrics data at metrics data sending and store blocks 1110 and 1086.

At action decision block 1111, on a first iteration thereof, orchestrator 110 can determine an initial hosting computing environment for the target application container selected at blocks 1301 and 1302. Orchestrator 110 for selecting the hosting environment for the selected target application container can select the hosting environment of the candidate computing environments of computing environments 120A-120Z producing the highest security score (lowest risk) as a result of the evaluating at block 1109.

On completion of action decision block 1111, orchestrator 110 can proceed to block 1112. At block 1112, orchestrator 110 can determine whether the action decision rendered at block 1111 was an action decision involving hosting action, e.g., to instantiate and host the target application container selected at blocks 1301 and 1302 on a certain computing environment of computing environments 120A-120Z. If a hosting action decision has been rendered, orchestrator 110 at send block 1113 can send hosting request data to one or more computing environment. The hosting request data can include hosting request data to host the target application container selected at block 1301 and 1302 on a selected computing environment selected at block 1111. In a second to Nth iteration of send block 1113 (after initial hosting), hosting request data sent at block 1113 can include, e.g., hosting request data to stop and remove a runtime application container in the performing of a re-hosting of the target application container. On a second to Nth iteration of hosting action decision block 1111, an alternate or additional hosting action can be specified, e.g., stopping and removing an application container, adjusting a hosting sharing ratio, and the like.

Hosting request data sent at block 1113, in accordance with an action decision at block 1111, can include hosting request data to instantiate K instances of the target application container selected a block 1301 and 1302 in dependence on end user demand requirements associated to the target application container. At block 1205, the relevant one or more computing environment of computing environments 120A-120Z can perform the required specified hosting operation, e.g., instantiation of K instances of the target application container selected at blocks 1301 and 1302. Instantiation of a target application container can include running a container build file to build a container image for a target application container and then running the resulting application container image to provide a running runtime instance of an application container.

On completion of block 1113 to send hosting request data, orchestrator 110 can proceed to machine learning block 1114. At block 1114, various machine learning processing can be performed. The machine learning processing at block 1114 can include, e.g., performing training of predictive model 9002 so that predictive model 9002 further learns of "effects" associated to pass/fail tests in relation to failure events, and querying predictive model 9002 to return "effects" data for purposes of updating a table in decision data structures area 2123 associating pass/fail tests to "effects" ratings.

At machine learning block 1114, orchestrator 110 can update training of predictive model 9002 as shown in FIG. 3A with use of metrics data obtained in response to block 1204 and stored at block 1086. Metrics data obtained in response to block 1204 can include security event metrics data associated to a security event. Security events can include positive security events and negative security events. Examples of negative security events can include security event failures, e.g., metrics data reporting a successful security attack involving, e.g., phishing or malware, loss of private keys, loss of container sensitive files, and loss of certificates keys. Positive security events can be events that are absent of security failure, e.g., a sustained (beyond threshold) period of time of deployment without a security failure. Positive security events can be provided in events indicating successful thwarting of the security attack.

Figure 3B:
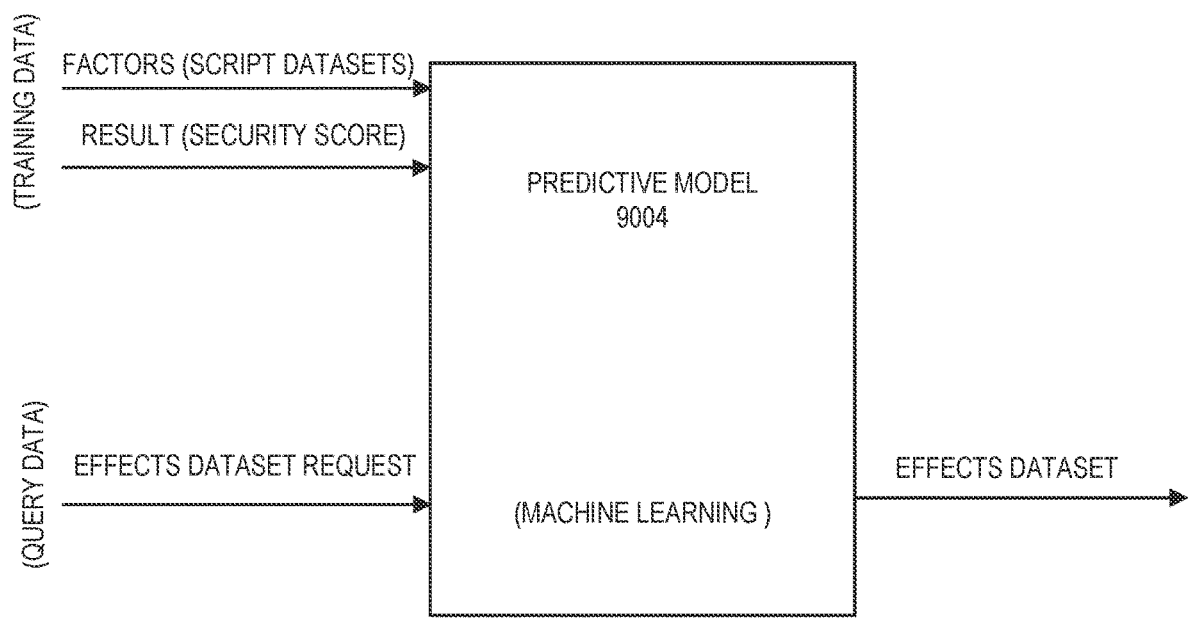

Embodiments herein recognize that while many different types of script dataset defined script data can be obtained for processing by orchestrator 110, some classifications of script data can serve as better indicators of overall security performance than other script datasets defining script data. According to one embodiment, orchestrator 110 at block 1114 in the performance of reinforcement learning can query predictive model 9004 as shown in FIG. 3B configured as machine learning mixed effect problem solver. Orchestrator 110 can query predictive model 9004 configured as a mixed effect problem solver for solving and assigning effect scores to various factors. The described mixed effect problem solver can be iteratively updated during the course of deployment of system 100 so that new data is iteratively applied for training predictive model 9004. Predictive model 9004 configured as a mixed effect problem solver can be configured to solve a set of equations in which each equation has (a) a set of factors mapping to respective script datasets associated to a base image, e.g., the ten script datasets of FIG. 7A, and (b) a result, the overall performance score for a particular scoring of a base image. New equations to be solved in a set of equations solved by predictive model 9004 configured as a mixed effect problem solver can be derived by processing script datasets received from a plurality of computing environments 120A-120Z. The sets of equations solved by predictive model 9004 configured as a mixed effect problem solver can include script datasets assigned as factors (a) having "effects" and the overall security score assigned by aggregation of security scores to a base image can be assigned as the result, and (b) in an equation set to be solved by the predictive model 9004 configured as a mixed effect problem solver.

Orchestrator 110 can maintain and iteratively update a plurality of instances of predictive model 9004 configured as a mixed effect problem solver for each target container base image being subject to management by system 100 and having an associated base image configuration of each of computing environments 120A-120Z.

Trained as described with newly input equations input into over time as training data via machine learning, predictive model 9004 can learn which classifications of script datasets have a threshold exceeding effect on overall security performance scores in which do not. At machine learning block 1114, orchestrator 110 can limit and restrict a current set of script datasets for obtaining from respective computing environments of computing environments 120A-120Z in dependence on the datasets determined by querying predictive model 9004 to be the most impactful script datasets having the highest "effect" ratings. Predictive model 9004, once trained, can output "effect" ratings associated to various script datasets evaluated by orchestrator 110. Some script scores can have threshold exceeding strong "effect" ratings, while others can have minimal "effect" ratings, indicating only a random effect. Accordingly, over time, script datasets, e.g., those having random effect-indicating effect ratings, can be dropped without developer user interaction. In addition, script data request data sent at block 1107 can be configured to permit discovery of new script datasets that have not been subject to prior evaluation by orchestrator 110. Script datasets can be returned which can include script datasets of new classifications newly introduced into respective ones of a plurality of computing environments 120A-120Z. In some embodiments, the number of newly discovered script datasets subject to evaluation at a given time can be restricted so that computing resources are conserved.

According to the described methods, poorly performing, e.g., "random effect" script datasets can be retired and new script datasets newly introduced and made available in new classifications on one or more computing environment of computing environments 120A-120Z can be discovered and subject to text string detection based security scoring. If a newly discovered script dataset is determined by use of mixed effect model solving at block 1114 to be impactful, e.g., determined to have a threshold exceeding "effect" or being among the top N impactful factors, it can be added to the restricted set of script datasets queried for with script data request data sent at block 1114. Intelligent pruning of script datasets from analysis using machine learning can improve the functioning of system 100 by alleviating computing resource consumption associated to non-impactful, e.g., "random effect" script datasets. Machine learning ability to discover and test new datasets can improve computing system performance by improving accuracy and permitting dropping of less impactful datasets. By reinforcement learning accomplished with use of predictive model 9004 configured as a mixed effect problem solver, orchestrator 110 can evaluate security performance of a target container base image and a target application container, including one or more target container base image using reduced and intelligently selected script datasets, to facilitate faster and more accurate computer-based processing.

The machine learning processing at block 1114 can include, e.g., performing training of predictive model 9004 so that predictive model 9004 further learns of "effects" associated to script datasets and querying predictive model 9004 to update a list in decision data structures area 2123 which provides a restricted list of qualified script datasets associated to a target container base image that is currently permissible to obtain from candidate hosting computing environments for purposes of performing evaluating at block 1109.

Figure 3C:
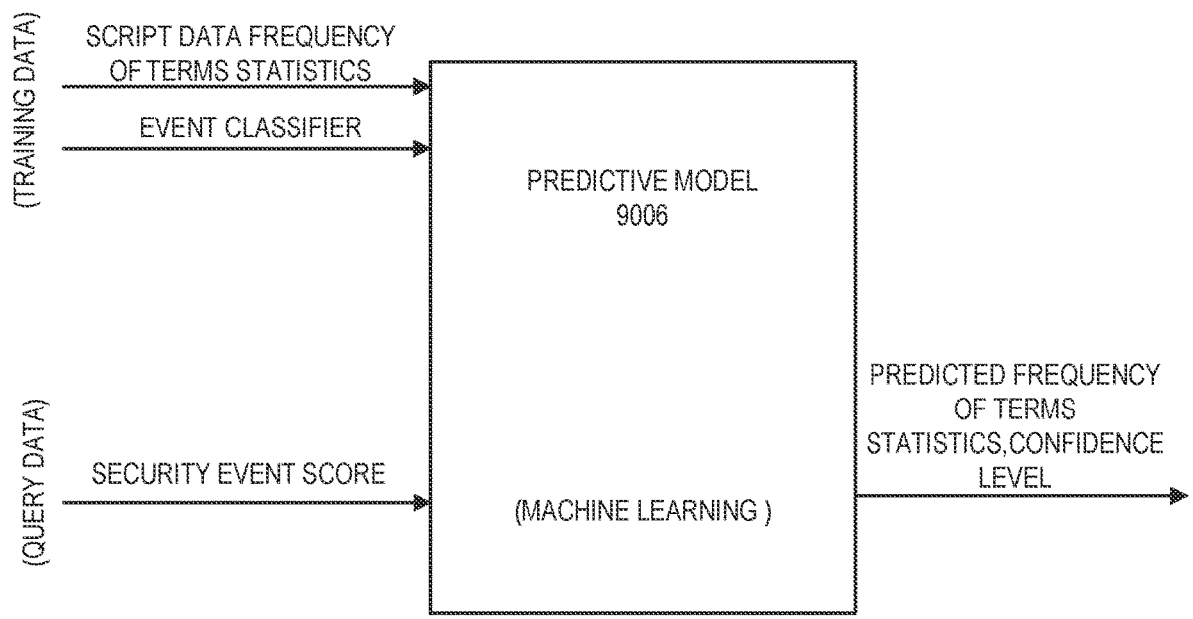

Referring to predictive model 9006 as shown in FIG. 3C, orchestrator 110 can train and use predictive model 9006 for purposes of graduating new text strings into text string lists searched for by orchestrator 110 in the performing of evaluating at block 1109.

Script data associated to a security event that occurs in association with a certain base image can be the most recent script data returned for the certain base image by computing environments 120A-120Z at send block 1203. Security events, positive or negative, can be returned and specified in metrics data sent by computing environments 120A-120Z at block 1204. Security events can be security events associated to a certain one or more target container base image of a set of target container base images defining a target application container. Security events can include positive security events and negative security events. Examples of negative security events can include security event failures, e.g., metrics data reporting a successful security attack involving, e.g., phishing or malware, loss of private keys, loss of container sensitive files, or loss of certificates keys. Positive security events can be events that are absent of security failure, e.g., a sustained (beyond threshold) period of time of deployment without a security failure. Positive security events can be provided in events indicating successful thwarting of the security attack.

Predictive model 9006 can be trained so that predictive model 9006 learns of text strings associated to security events, positive or negative, for a certain target container base image. Predictive model 9006 can be trained with training data and once trained, predictive model 9006 can be queried with use of query data. Predictive model 9006 can be trained with iterations of training datasets. Each respective training dataset for training predictive model 9006 can include (a) script data frequency of term statistics dataset associated to a security event, and (b) a security event security score. The security event script data frequency of term statistics dataset can refer to frequency of term statistics dataset associated to a detected security event, positive or negative. Thus, if security event data is sent at a most recent iteration of block 1204, orchestrator 110 can associate the most recent iteration of script data sent at block 1203 to the security event data and can examine the returned script data returned at block 1203 for determining a frequency of term statistics dataset for the last iteration of script data associated to the security event data indicated in the metrics data sent at block 1204. The security event security score (b) can refer to a classification of the security event, e.g., can specify whether the security event is a positive security event or a negative security event. A positive security event can refer to a security event indicating security strength. A negative security event can be a security event indicating security weakness. Predictive model 9006, once trained, can be queried with use of query data. The query data can include a security event score. Queried with the described query data, predictive model 9006 can return prediction data. The prediction data can include a prediction of frequency of term statistics associated to the query data together with a confidence level associated to the frequency of term statistics. Trained as described, predictive model 9006 can return predictions as to text strings that are associated to security events, i.e., positive security events and negative security events. The training is able to return predictions as to text strings associated to security events, positive or negative, of the different classifications, e.g., phishing or malware. At machine learning block 1114, orchestrator 110 can perform one or more of training or querying of predictive model 9006. Training of predictive model 9006 can include application of a training dataset comprising the data items (a) and (b) described herein in reference to FIG. 3C associated to any security event indicated with metrics data sent at the most recent iteration of block 1204. Querying of predictive model 9006 can include querying predictive model 9006 with two different queries.

The two different queries can include the queries shown in Table C.

TABLE C

| Row | Query | Output |
|---|---|---|
| 1 | (i) security event score = 10 (strong security) | Predicted frequency of terms statistics dataset 1 and confidence levels |
| 2 | (ii) security event score = 0 (weak security) | Predicted frequency of terms statistics dataset 2 and confidence levels |

The output of predictive model 9006 can include, as shown in Table C, predicted frequency of term statistics associated to the different queries. Orchestrator 110 at machine learning block 1114, with use of decision data structure stored in decision data structures area 2123, can decide to graduate new text strings into the text string lists searched for by orchestrator 110 at block 1109. If the return output data from predictive model 9006 indicates that a text string is strongly associated (as indicated by confidence level) to a negative or positive security event, orchestrator 110 can add the text string to a list of text strings searched for at block 1109. Orchestrator 110 can use the presence of an added text string in translating a binary pass/fail result into a qualitative impact security score. In the case the added text string is strongly associated to negative security events and is discovered with requisite frequency in the script dataset being subject to evaluation, orchestrator 110 can bias an impact security parameter value for the script dataset upward. In the case the added text string is strongly associated to positive security events and is discovered with requisite frequency in the script dataset being subject to evaluation, orchestrator 110 can bias an impact security parameter value for the script dataset downward.

On completion of block 1114, orchestrator 110 can proceed to block 1115. At block 1115, orchestrator 110 can ascertain whether the deployment period has ended. The deployment period can end, e.g., when an enterprise developing the target application container decides to decommission the service associated to the target application container. For the time that the deployment period has not ended, orchestrator 110 can return to block 1107 and at block 1107 can send a next iteration of script data request data to computing environments of computing environments 120A-120Z.

Embodiments herein recognize that from time to time, computing environments can change security policy in a manner that applies to one or more container base image and therefore, the container base image for compliance with the new security policy can correspondingly change. With changes in a container base image configuration, script data e.g., text-based script code and text-based comments returned by performance of extracting block 1202 can correspondingly change and script data returned to orchestrator 110 at block 1203 can also change. Orchestrator 110 for a time of the deployment can iteratively perform the loop of block 1107 to 1114 to iteratively request new script data, to iteratively receive new return script data sent at block 1203, and to iteratively store new script data into data repository 108.

Security attributes of container base images available on different computing environments can be subject to configuration changes and such configuration changes can be reflected in updated script data sent at iterations of block 1203. Orchestrator 110 performing evaluating using script data at block 1109 through multiple iterations can detect that there has been a change in a configuration of one or more container base image of one or more computing environment. More specifically, orchestrator 110 at evaluation block 1109 can produce differentiated security strength scores in dependence on changes made in commonly named but differently configured container base images and different computing environments.

In some circumstances, orchestrator 110 at action decision block 1111 can decide to switch hosting of the target application container selected at blocks 1301 and 1302 to a different computing environment of computing environments 120A-120Z in dependence on the evaluating block 1109. For example, if the evaluating block 1109 indicates that computing environment 120A has become the most secure computing environment for hosting the target application container selected at blocks 1301 and 1302, and that the most secure hosting environment as selected in a prior iteration of block 1111 is no longer the initially selected computing environment 120B, orchestrator 110 at action decision block 1111 can determine a hosting location of the target application container selected at blocks 1301 and 1302 so that hosting is changed to computing environment 120A. In such a scenario, orchestrator 110 at block 1112 can determine that a hosting action decision has been made and at block 1113 can send appropriate hosting request data to the relevant computing environments of computing environments 120A-120Z.

In the use described with reference to Table B, computing environment 120B can be the current hosting environment and computing environment 120A, the new hosting computing environment. In such a scenario, orchestrator 110 at block 1113 can send host request data sent to computing environment 120B to stop and remove the K instances of the target application container selected at blocks 1301 and 1302 hosted and running on one or more computing node 10 of computing environment 120B. In the described scenario, orchestrator 110 can also send hosting request data to instantiate K instances of the target application container selected a block 1302 so that the K instances of the target application container are re-hosted on one or more computing node 10 of computing environment 120A.

It will be seen that orchestrator 110 during a deployment period can perform multiple iterations of the loop of blocks 1107 to 1115 and can iteratively send hosting request data block 1113 times throughout the deployment to switch hosting of the target application container selected at blocks 1301 and 1302 between different computing environments based on the evaluating performed at block 1109 in order to assure monotonicity of security performance. Orchestrator 110 can host and re-host the target application container multiple times so that a computing environment specific configuration of the target application container can always be hosted on a computing environment having threshold satisfying security performance level, and in one embodiment, can always be hosted on the determined most secure computing environment throughout multiple changes of multiple container base images within multiple computing environments 120A-120Z.

Computing environments 120A-120Z at block 1206, like orchestrator 110, can monitor for termination of a deployment period. Data indicating a decision to end deployment can be communicated within hosting request data sent at block 1113. On completion of block 1205, computing environments 120A-120Z can proceed to block 1206 to determine whether a deployment period has ended. If a deployment period has not ended, computing environments 120A-120Z can iteratively perform the loop of blocks 1202 to 1206 to iteratively perform extracting at block 1202 in response to script data request data. Computing environments 120A-120Z can iteratively perform sending at block 1204 of script data to orchestrator 110 and can iteratively perform block 1204 to send metrics data to orchestrator 110. Metrics data sent by computing environments 120A-120Z can include metrics data specifying security events, including positive security event and negative security events. On receipt of the metrics, orchestrator 110 at send block 1110 can send for storage the metrics data to data repository 108, which can store the metrics data at store block 1086.

On completion of a deployment (block 1115), orchestrator 110 can proceed to return block 1116. At return block 1116, orchestrator 110 can return to the stage proceeding block 1104 to wait for new triggering data specifying a new target container. It will be understood that orchestrator 110 can be performing multiple instances of the loop of blocks 1104-1116 in parallel simultaneously.

On a determining at block 1206 that the deployment period has ended, computing environments 120A-120Z can proceed to return block 1207. At return block 1207, computing environments 120A-120Z can return to a stage prior to block 1202 to wait for next script data request data associated to a different target application container. It will be understood that computing environments 120A-120Z can be performing multiple instances of the loop of blocks 1202-1206 simultaneously and in parallel.

Predictive models 9002, 9004 can be configured as mixed effect models. For providing a mixed effect model, mixed effect modeling solver software can be used to perform mixed effect model solving. The lme4 package for R provides functions to fit and analyze linear mixed models, generalized linear mixed models, and nonlinear Jinxed models (R is a programming language and software environment for statistical computing and graphics that is supported by the R Foundation for Statistical Computing). WinBUGS is a statistical software in which there is the glmmBUGS package that provides a bridging tool between Generalized Linear Mixed Models (GLMMs) in IR and the BUGS language and can perform mixed effect model analysis (WinBUGS is a statistical software package available from the MRC and Imperial College of Science, Technology and Medicine. In one embodiment, for solving mixed effect models, SAS/STAT® Mixed Effect Modeling Software available from SAS Institute, Inc. of Cary, N.C. (SAS/STAT is a registered trademark of SAS Institute, Inc.) can be used.

Various available tools, libraries, and/or services can be utilized for implementation of predictive model 9006. For example, a machine learning service can provide access to libraries and executable code for support of machine learning functions. A machine learning service can provide access to a set of REST APIs that can be called from any programming language and that permit the integration of predictive analytics into any application. Enabled REST APIs can provide e.g., retrieval of metadata for a given predictive model, deployment of models and management of deployed models, online deployment, scoring, batch deployment, stream deployment, monitoring, and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation.). A machine learning service provided by IBM® WATSON® can provide access to a set of REST APIs that can be called from any programming language and that permit the integration of predictive analytics into any application. Enabled REST APIs can provide e.g., retrieval of metadata for a given predictive model, deployment of models and management of deployed models, online deployment, scoring, batch deployment, stream deployment, monitoring, and retraining deployed models. Predictive models can employ use of, e.g., neural networks, support vector machines (SVM), Bayesian networks, and/or other machine learning technologies.

There is set forth herein a method and system for risk-based coordination of container image deployments using mapping monotonicity and artificial intelligence (AI). There is set forth herein a method and system to coordinate container image deployments with lower risk and to reduce security exposure that could lead to service interruption. Embodiments herein recognize that when deploying a new container-based application collected from different image sources, i.e., referencing a variety of base images, a developer user can waste time to evaluate any issue or security exposure on multiple base container images available from different computing environments, e.g., cloud providers. Embodiments herein can address the following common problems: (a) container images and build files with security exposures; (b) container runtime configurations with security deviation; (c) uncertainties regarding required application security contexts; (d) challenges to keep up to date the enterprise security policies across several application instances in a timely manner; (e) time consuming leveraging the target deploy to confirm the reliability of each provider image. Embodiments herein can automatically identify security risks on target application containers for avoidance of human error prone security verification. Embodiments herein can group the security controls across container base images of multiple providers and can determine a lower risk provider for application deployment. Embodiments herein can provide deployment of multiple target application containers across multiple different cloud providers. Embodiments herein can provide application of monotonic functions to correlate risks in application similarities and characteristics. Embodiments herein can assure that every identifier is correctly maintained and that every application has a valid policy invariant. Embodiments herein can employ using reinforcement learning to determine a final risk matrix to guide a best deployment strategy. Embodiments herein can provide determining an optimized pattern of examined data sources using machine learning to facilitate the use of risk-based deployment strategy in association with infrastructure of different providers. Embodiments herein recognize that changes to security requirements have brought new complexity to all types of enterprise entities. Embodiments herein recognize that regardless of the type of computing environment (e.g., cloud service) used, compliance standards can pose challenges. Embodiments herein recognize that updating base image configurations from respective ones of a plurality of computing environments manually can consume time. Challenges also are posed in terms of what security configurations are to be applied to those images, coupled with the complexity of constant updates in the terms of usage of each of several cloud providers. Additionally, embodiments herein recognize that these verifications may be more prone to failure and not aware that an application or specific parts of an application are unapproved yet running in an environment. Furthermore, embodiments herein recognize that risk can increase when applications require a fast decision and cannot support time resources to validate a new version of an image from a provider in spite of a severe vulnerability being observed and in need of immediate update. Embodiments herein recognize that there is a need to develop a method for risk-based application container deployment across multiple computing environment providers to leverage as quick as possible the security configurations and requirements by application similarities and to coordinate pooling of application deployment using invariant mapping monotonicity and reinforcement machine learning. Embodiments herein can group security controls of container images across multiple providers and consider reports on pending application deployments of multiple target images from different cloud providers. Embodiments herein can consider single function applications to correlate application similarities and characteristics of risk and can identify low risk providers for application deployment. Embodiments herein can use supervised and semi-supervised machine learning to provide patterns that are recognized as reusable by other applications, cloud deployments, and systems by similarities and risk-based decision making. Embodiments herein can provide monotonicity of mapping to identify: the image context similarity, characteristics, and security usage context of the application program, and can generate a risk matrix with a lower risk deployment target for an image of the application program. Embodiments herein can orchestrate an improved strategy of deployment based on risks identified and, trained by supervised machine learning, can orchestrate capabilities previously analyzed by mapping monotonicity across multiple cloud provider. Embodiments herein can use a pool of deployment strategies to coordinate better and lower risk deployment of target images.

Embodiments herein can employ reinforcement learning to evaluate the output of mapping monotonicity by deploying an application in a lower risk environment. The described deployment can be regarded to be a meta-deployment and can contain, in one embodiment, only the requirements for the image location of the source container. Embodiments herein can employ reinforcement learning to assure that each application container correctly maintains the invariant that each application has a valid strategy, so as to determine the value to be mapped into a final risk matrix. A final risk matrix can guide the best strategy deployment based on risk analysis across different computing environments. Embodiments herein can facilitate the training of patterns detected using machine learning, which allows the best risk-based deployment strategies to be used by other similar applications between different providers. Embodiments herein can evaluate application similarities and can use the concept of monotonicity to map and index the characteristics and security contexts of application containers of respective ones of a plurality of cloud providers. This way, embodiments herein can allow a comparison of history and current security requirements given the nature of the application and define the best strategy for deployment by leveraging container images of multiple computing environments. Embodiments herein can employ mapping monotonicity to identify application image context similarities, characteristics, security use context, and to generate a risk matrix for identification of a lower risk deployment target for a certain application image. Mapping monotonicity features herein can facilitate indexing an invariant policy of each container image identifier. Embodiments herein can use reinforcement learning to evaluate the output of mapping monotonicity by deploying an application to a lower risk environment. With use of reinforcement learning, there can be provided a best strategy of deployment for an application image, and for updating a final risk matrix with the results. Embodiments herein can provide a method to use a pool of deployment strategies to orchestrate the better and lower risk target deployment for a container image. Machine learning can feed the pattern identified to be re-used by other applications, cloud deployments, and systems. Embodiments herein can group security controls across multiple provider container images and can determine a lower-risk provider for application deployment considering (a) generating of pending application deployments across multiple target images from different cloud providers, (b) application of monotonic function to correlate risks in application similarities and characteristics, (c) enforcing that every identifier is correctly maintained and that every application has a valid policy invariant, using reinforcement learning to determine the values to be later mapped into a final risk matrix to guide the best strategy of deployment, and fostering training and feeding of the pattern detected using machine learning that allows the best risk-based deployment strategy to be used by other similar applications across different providers. Embodiments herein can group cloud providers with deployment of pending applications. In this process, the method can use security configuration metadata to extract results in a string and compare with history and can continue to save that information in a monotonic database with the cloud provider identifiers and applications, without overlapping them so that there is assurance that every identifier has a valid policy invariant.

The flowchart of FIGS. 4A-4B, in reference to blocks 4002, 4004, 4006, 4008, 4010, 4012, 4014, 4016, 4018, 4020, 4022, and 4024 describes aspects of items involved in mapping monotonicity conditions, and sets forth items and dimensions and items inside those dimensions that can be checked on each image that can be deployed.

The method set forth in reference to FIGS. 4A-4B can query the characteristics of a base image by checking a mapping input table in order to initiate the individual assessment of the cloud provider's container base image. Embodiments herein can check a set of container runtime configurations herein, which are the current discretionary accesses and privileges, images registries, protection of resources, stored data or message encryption existence, application logging, and also whether there is sharing between namespaces of a privilege user in a host and the application container. The described information can be stored as valid policies whereas the monotonic function can restrict cross updates to the described indexing In Table D, there is set forth a code sample to execute the functionality.

TABLE D def putCloudtargetid(putCloudtargetid _id, securitypolicy_id):
if securitypolicy Service.getPolicy(securitypolicy_id) == 404:
fail("No such security policy: " + securitypolicy_id)
else:
database.storeAccount(cloud_id, securitypolicy_id)

The method can check for discrepancies in characteristics, context of security controls using Rest-API call to the databases of R1, R2 and R1⊆R2 have Q(R1) Q(R2), then the monotonic Q query in a R2 Rest-API call to the database with more rows than other D1 databases. With the described results, reinforcement learning can verify which is the best destination strategy with the lowest risk, can generate a final risk matrix, can determine the destination provider with the lowest risk, and can perform deployment with the meta-application for validation. The described process can be continuous for all application containers pending deployment. The described deployment process can be based on a final risk matrix created by reinforcement learning. Another process can be initiated to feed an identified pattern of data source examination and allow other computing environments to use this pattern for similar applications. Embodiments hereon can be configured so that the described information continues to be saved in a database with monotonic mapping that prevents information from being overlapped. Embodiments herein can include methods for adding and retrieving cloud provider identifiers and security policy objects. The database connection between cloud providers and strategy can be realized through an identifier application. Embodiments herein can include a 1:N connection; that is, each account can include a policy, and the same security policy can be applied to multiple cloud identifiers. This process can be applied across base images of multiple providers, for example.

As explained with reference to FIGS. 5 and 6, various methods can be used to transform pass/fail risk scores into security parameter values, which can be aggregated to provide security scores that attached to script datasets, which can be aggregated to provide a security score for a base image.

Figure 6:
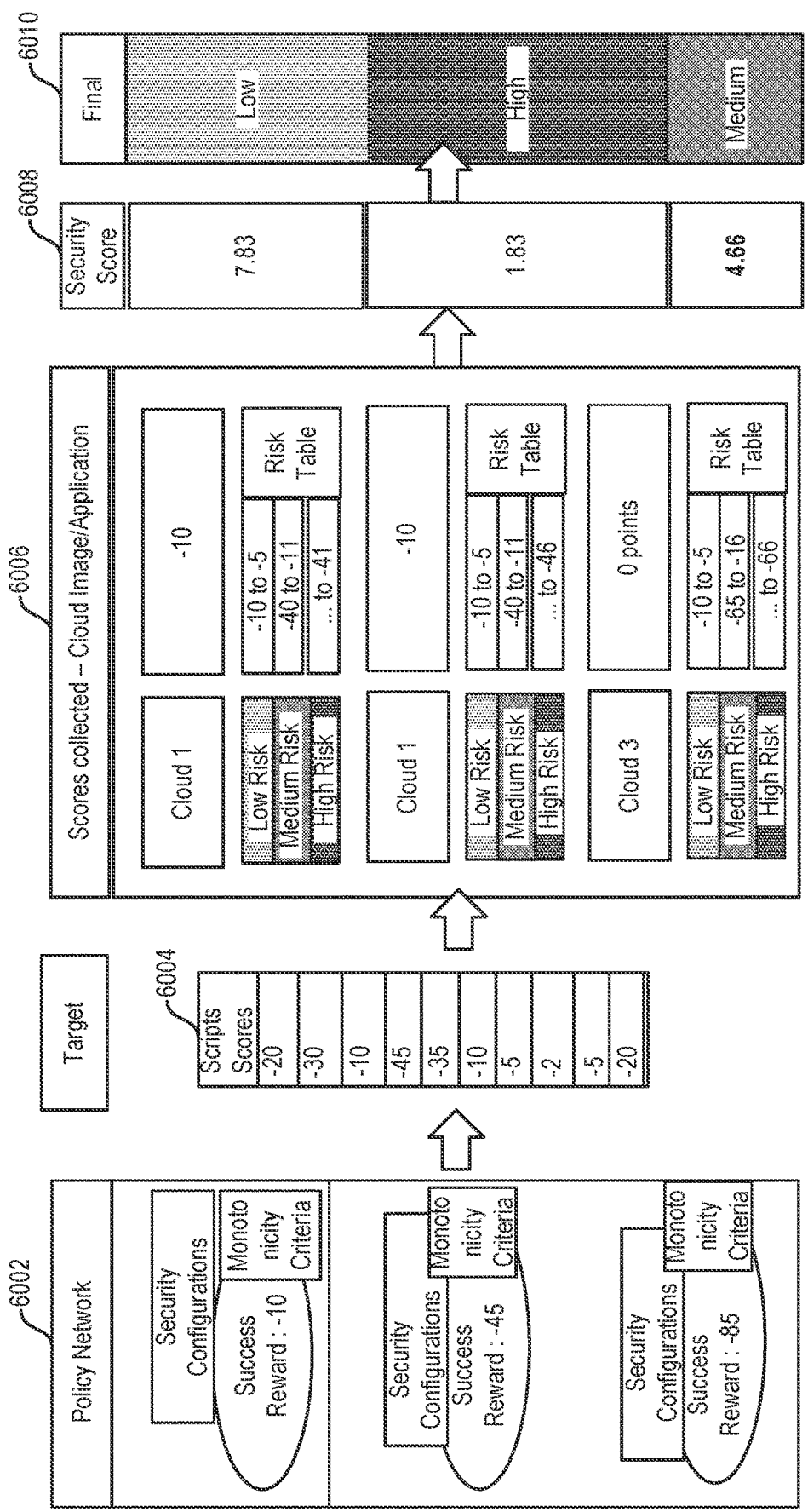
FIG. 6 depicts security score data and computing environment selection according to one embodiment.

Referring to FIGS. 5 and 6, scripts scores can be used to populate a risk table carried by script ID, exploitability, pervasiveness, impact, calculating the arithmetic average of those values and determining which is the higher, medium, and lower security risk container image available for deployment. This security risk scale can be arbitrarily selected to be on a scale from 1 to 5, whereas 1 is too low, and 5 is too high risk. The verification above is individual to the image of each of the cloud provider. Given the nature of reinforcement learning used by the described method, the described semi-supervised artifact can leverage the application deployment into all other cloud accounts using their images by similarities of application.

Application similarities can be identified through use of mapping monotonicity by grouping the pending application deployment and further indexing their characteristics from a runtime application container image. Each verification on an image of a respective cloud provider can be populated into a final risk matrix as shown in FIG. 6. The values input into monotonicity conditions can be output from scripts run in a container runtime environment. The method can use a knowledgebase composed of learning feeding and security standards, such as CVSS, MITRE®, and CIS, for example. The method can define how easily exploitable security problems can be found. The method can define how many provider container images were identified as having an associated test failure and can use that measurement as an input into a pervasiveness measurement. The method can define impact in terms of negative security events, e.g., including what type of security problem was found, such as private keys, container sensitive files, and certificates keys, etc. The method calculates the arithmetic average of each targeted deploy, considering the application name identifier, what was the risk area leveraged, and what type of platform was used by the application, along with the image product and version, what address was used as the image of the provider, how many conditions of monotonicity were found, the arithmetic average calculated over exploitability, pervasiveness, and impact across a multi-provider image assessed, and the final result of all of targeted deployment can be evaluated. The method can use this result to drive the application deployment as the best strategy given the application similarities and fast update of container images across multiple provider infrastructures. The method can generate a final dashboard for awareness and explanation of the rationale behind a risk-based decision.

Embodiments herein can include building a reinforcement learning model from a simulated environment, in order to select better script datasets for each dimension and build a reinforcement learning model with a policy network. In an execution phase, a data input from a user can be passed by a reinforcement learning model to execute risk scanning and can generate a risk score. The risk score can be transformed to a dashboard and can feed the knowledge base for the next method retraining.

Aspects of a training phase are described with reference to blocks 7002, 7004, 7006, 7008, 7010, 7012, and 7014 of FIG. 7A. In a training phase (reinforcement learning training phase), various features can be checked. The features can include, for example, discretionary access control (DAC), protocols, etc., as shown in block 7002. There can be checked dimension: What is the major dimension that is being checked (security controls, identifiers). There can be a checked platform: container as a service, UBUNTU, etc. The target variable can be, e.g., the risk score.

In reinforcement learning training phase, there can be provided the data from a knowledge base with initial planning of scripts (block 7006). There can be provided more than one script solution to check the environment. The method can train the policy network (block 7010) with a simulated (test) environment selecting the best scripts for each feature/dimension/platform keys and the policy network with transition and rewards for each script generating the policy network. At block 7012, scripts can be stored and the model trained to be used with new data in a model execution phase.

Figure 7B:
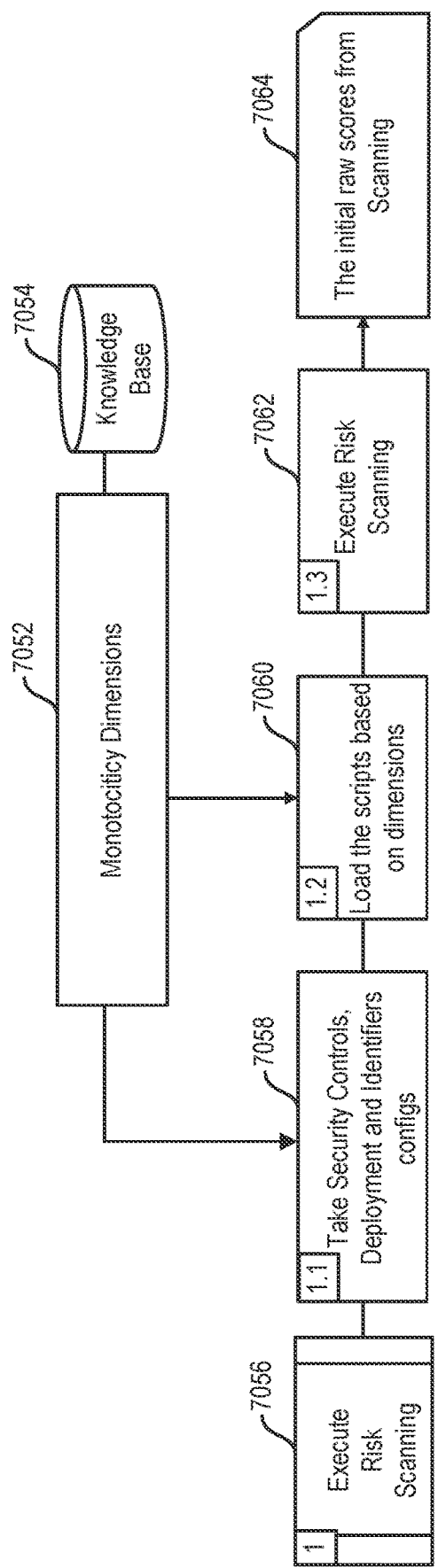

An execution phase is described with reference to blocks 7052, 7054, 7056, 7058, 7060, 7062, and 7064 of FIG. 7B. In an execution phase, there can be performed at 1 (block 7056): Execute risk scanning. The reinforcement learning can be executed with a real image from user input; at 2 (block 7058): Define an application that will deploy on specific cloud provided: The scores from block 7056 can be transformed with a risk table considering exploitability, pervasiveness and impact criteria and can build a final score where the case with lowest risk can be selected to be deployed. The method can load the table of features/dimensions/platform with scripts selected in a training phase (monotonicity dimensions) (block 7058). At 1.2 (block 7060), scripts associated with a monotonicity dimension can be loaded. At 1.3 (block 7062), risk scanning can be executed and the outcome can be the initial raw scores from scanning. When a new data is executed against the model, the data collected from an image to be verified and can be composed by: (a) features to be checked, for example, can include discretionary access control (DAC), protocols, etc.; (b) dimensions: (security controls, identifiers); platforms: container as a service. The target variable can be the risk score.

Figure 8:
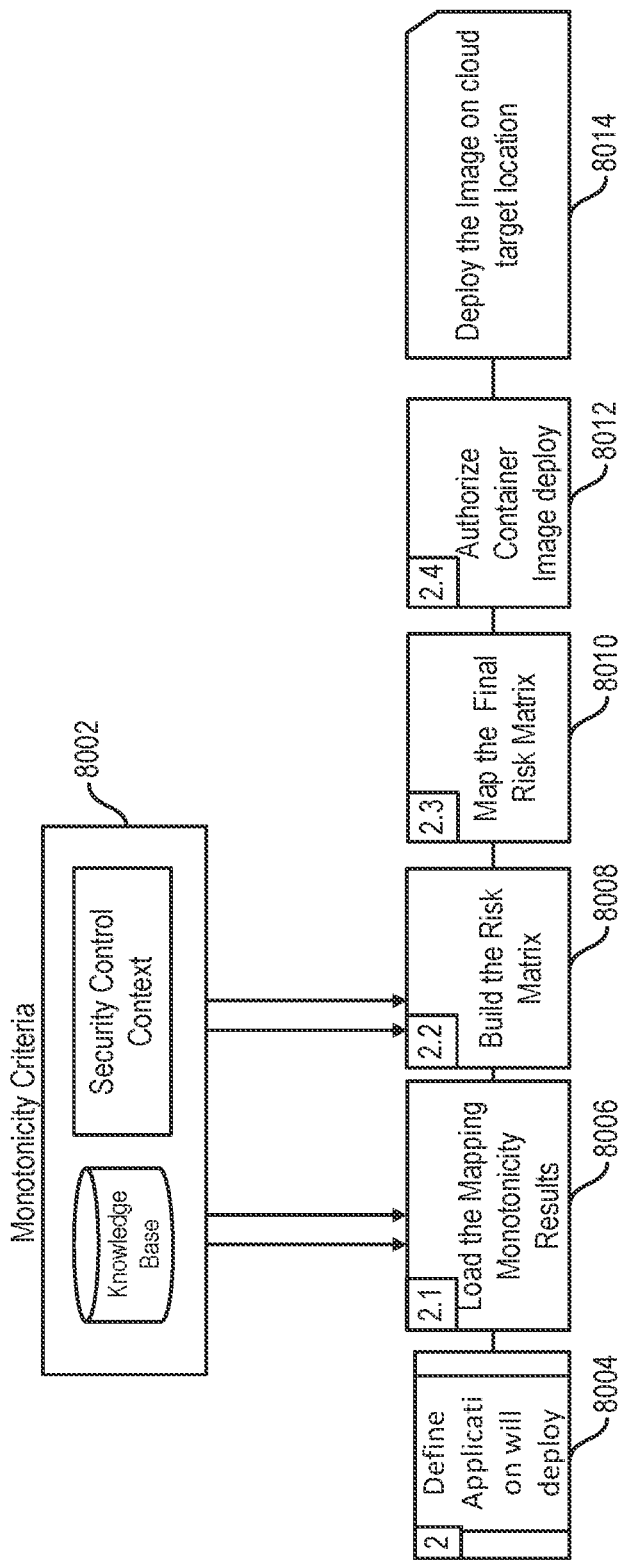
FIG. 8 depicts a flowchart illustrating operation of an orchestrator according to one embodiment.

A method for determination of a lower risk cloud is described in reference to blocks 8002, 8004, 8006, 8008, 8010, 8012, and 8014 of FIG. 8. Determining a lower risk cloud location for a container image deployment can consider a monotonicity criterion and can comprise the following: At 2.1 (block 8006), the method can load the script score results for each cloud provider and can perform meta deployment. At 2.2 (block 8008), the method can build the risk matrix doing the transformations using a risk table already defined. At 2.3 (block 8010), the method can map the final risk matrix and build the final dashboard with the final risk to show and save into a final risk matrix (FRM) repository. At 2.4 (block 8012), the method can authorize the deployment with less risk to the user. The pattern calculated can feed the machine learning for next decisions in other environments/clients and situations.

At 2.3 (block 8010), using risk table, there can be transformed the raw scores provided by reinforcement learning and applying some qualifications such as exploitability, pervasiveness, and impact measures in order to generate a security risk and mapping to a final classification (high, medium, or low) using a threshold table. Scores can be converted in positive numbers with formula (min–max) scores Score (new)=(Score(old)−Score(min))/(Score(max)−Score(min))

Certain embodiments herein may offer various technical computing advantages and practical applications to address problems arising in the realm of computer systems. Embodiments herein can include features to promote monotonicity, e.g., in the hosting of a selected target application container selected for hosting on one or more computing environment. Embodiments herein can include examining configuration data associated to a target application container for identifying of target container base images referenced in the target application container. Embodiments herein recognize that a certain target application container can have different configurations depending on which computing environment of a set of computing environments the target application container is hosted on. Embodiments herein can include sending of script data request data to a plurality of computing environments responsively to selecting of a target application container. Differentiated returned script data can be returned in response to the described request data from the various different computing environments. An orchestrator can process the returned script data to determine a security score for each computing environment associated to the target application container. The orchestrator can select a certain computing environment from a plurality of candidate computing environments in dependence on text processing of returned script data. An orchestrator can host the target application container on a selected one computing environment based on the evaluating and, subsequent to initial hosting, can perform continued obtaining and monitoring of returned script data from various candidate computing environments. In dependence on the continued monitoring, an orchestrator can provide monotonicity of target application container performance by transitioning hosting of a target application container in dependence on the continued monitoring. Continued monitoring can facilitate, e.g., re-hosting of a target application container on a new computing environment in the case there is a change in one or more container base image associated to a certain computing environment impacting the container base image. Embodiments herein can employ reinforcement machine learning and mixed effect problem solver machine learning to identify "random effect" script datasets, which can be removed from an analysis list for faster computing speed and reduced computing resource consumption. Various decision data structures can be used to drive artificial intelligence (AI) decision making, such as decision data structures that facilitate restricted use of best performing script datasets in the evaluating of different candidate hosting computing environments. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g., processing for transforming unstructured data into a form optimized for computerized processing. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 9:
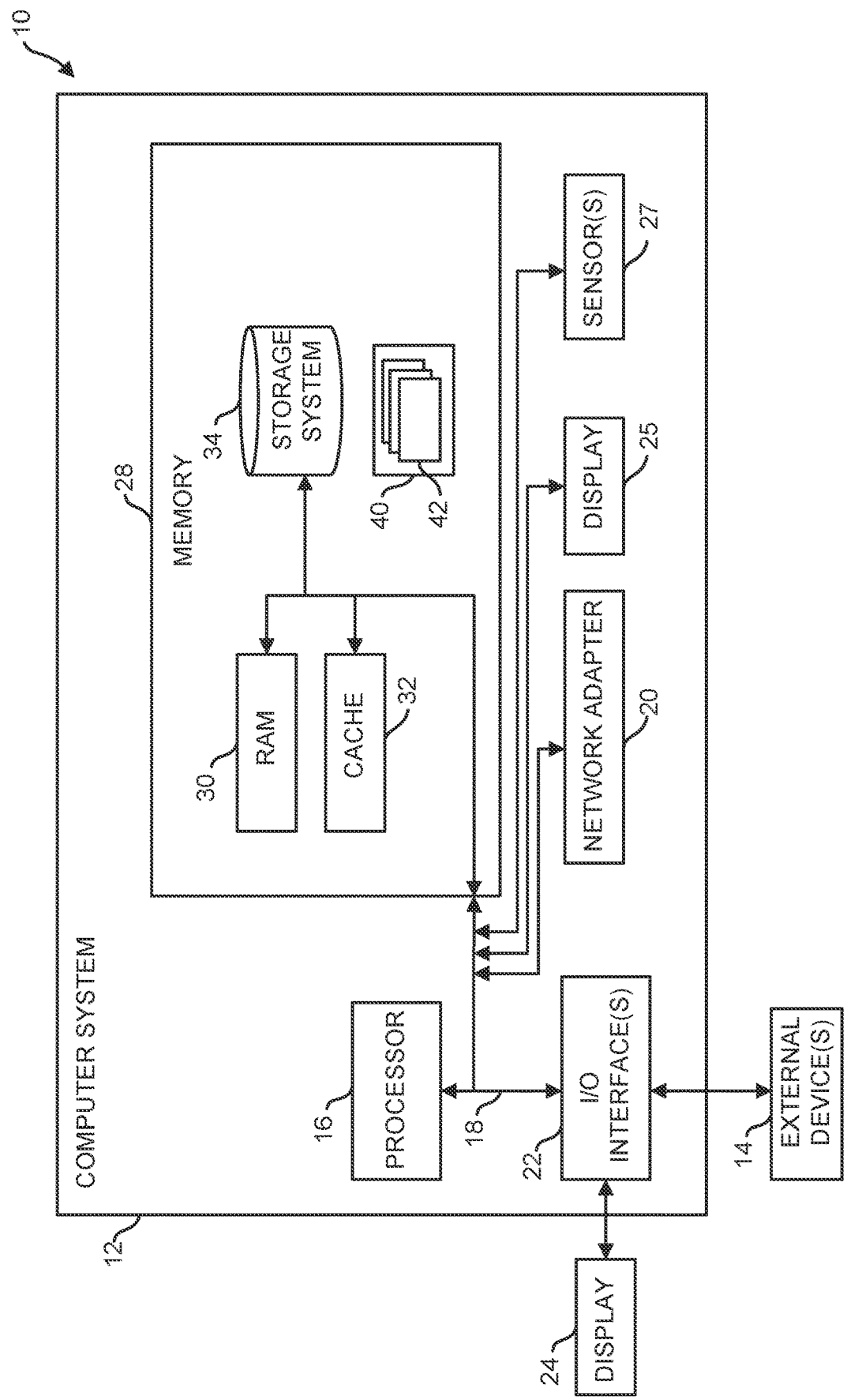
FIG. 9 depicts a computing node according to one embodiment.
Figure 10:
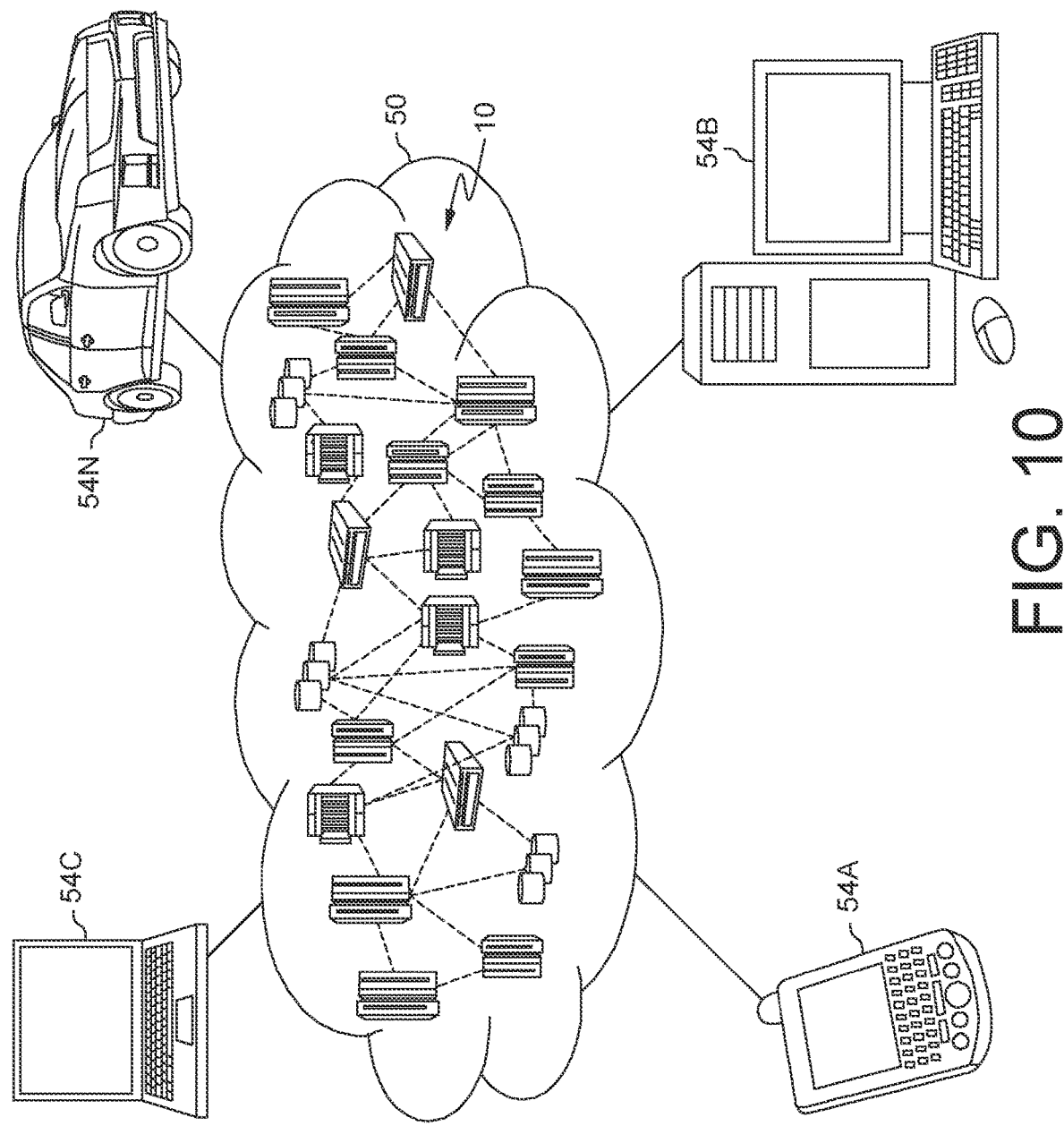
FIG. 10 depicts a cloud computing environment according to one embodiment.
Figure 11:
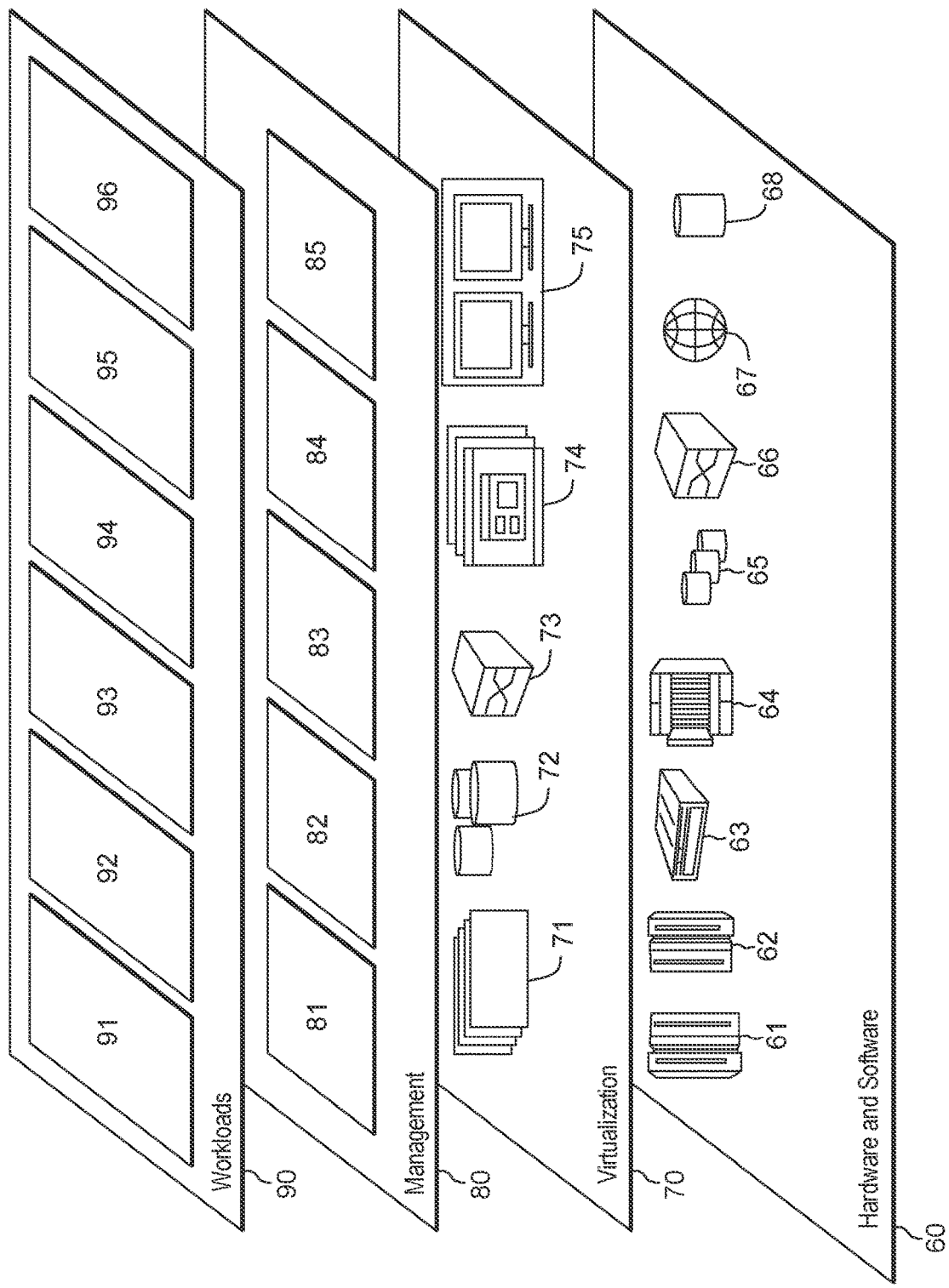
FIG. 11 depicts abstraction model layers according to one embodiment.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, orchestrator 110 can include one or more computing node 10 and can include one or more program 40 for performing functions described with reference to orchestrator 110 as set forth in the flowchart of FIG. 2, as well as the functions described with reference to the remaining flowcharts. In one embodiment, computing environments 120A-120Z can include one or more computing node 10 and can include one or more program 40 for performing functions described with reference to one or more computing environments 120A-120Z as set forth in the flowchart of FIG. 2 as well as described in remaining flowcharts. In one embodiment, one or more UE device 130A-130Z can include one or more computing node 10 and can include one or more program 40 for performing functions described with reference to one or more UE device 130A-130Z as set forth in the flowchart of FIG. 2 as well as described in remaining flowcharts. In one embodiment, the computing node based systems and devices depicted in FIG. 1 can include one or more program for performing functions described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for application container hosting as set forth herein. The processing components 96 can be implemented with use of one or more program 40 described in FIG. 9.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the tem) "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
   examining target application container configuration data to identify one or more target container base image referenced in the target application container configuration:
   subjecting script data associated to the one or more target container base image to text based processing, wherein the text based processing comprises a text string associated with a confidence level, for evaluation of security risk associated to the one or more target container base image, the script data obtained from at least one candidate hosting computing environment;
   selecting a hosting computing environment from the at least one computing environment for hosting a target application container, the selecting in dependence on the text based processing; and
   iteratively performing the text based processing for evaluation of security risk and the selecting the hosting computing environment, wherein the method includes hosting the target application container on a first computing environment, and re-hosting the target application container on a second computing environment having a threshold satisfying a security performance level, responsively to a determination using the text based processing that the second computing environment poses reduced security risk relative to the first computing environment.

2. The computer implemented method of claim 1, wherein the method includes sending script data request data to at least one candidate hosting computing environment for return of one or more script dataset associated to respective ones of the one or more target container base image.

3. The computer implemented method of claim 1, wherein the method includes sending script data request data to at least one candidate hosting computing environment for return of a plurality of script datasets associated to respective ones of the one or more target container base image.

4. The computer implemented method of claim 1, wherein the subjecting script data associated to the one or more target container base image to text based processing for evaluation of security risk associated to the one or more target container base image includes obtaining a set of script datasets defining the script data, and wherein the obtaining includes obtaining script datasets in a restricted set of script dataset classifications, the restricted set of script datasets determined using reinforcement machine learning in which datasets defining script data are removed from an evaluation list.

5. The computer implemented method of claim 1, wherein the text based processing includes identifying whether a specified text string is included in the script data.

6. The computer implemented method of claim 1, wherein the text based processing includes identifying whether a specified text string is included in the script data, returning a pass fail result in dependence on the identifying.

7. The computer implemented method of claim 1, wherein the text based processing includes identifying whether a specified text string is included in the script data, returning a pass fail result in dependence on the identifying, and transforming the pass fail result into one or more qualitative security parameter value, the one or more qualitative security parameter value being selected from a group consisting of an exploitability security parameter value, a prevalence security parameter value and an impact parameter value.

8. The computer implemented method of claim 1, wherein the text based processing includes identifying whether a specified text string is included in the script data, returning a pass fail result associated to a pass fail security test in dependence on the identifying, and transforming the pass fail result into an exploitability security parameter value, and wherein the transforming includes performing online searching of online security literature using text of the pass fail security test.

9. The computer implemented method of claim 1, wherein the method includes iteratively performing the text based processing and the selecting the hosting computing environment.

10. The computer implemented method of claim 1, wherein the method includes initially hosting the target application container on a first computing environment, and re-hosting the target application container on the second computing environment, responsively to the determination using the text based processing that the second computing environment poses reduced security risk relative to the first computing environment.

11. The computer implemented method of claim 1, wherein the examining target application container configuration data to identify one or more target container base image referenced in the target application container configuration includes examining target application container configuration data to identify a plurality of target container base images referenced in the target application container, and wherein the script data obtained from the at least one candidate hosting computing environment is defined by script datasets respectively received from respective first and second computing environments.

12. The computer implemented method of claim 1, wherein the examining target application container configuration data to identify one or more target container base image referenced in the target application container configuration includes examining target application container configuration data to identify a plurality of target container base images referenced in the target application container, and wherein the script data obtained from the at least one candidate hosting computing environment is defined by script datasets respectively received from respective first and second computing environments of a plurality of candidate hosting computing environments, wherein the method includes iteratively performing the text based processing and the selecting the hosting computing environment, wherein the method includes hosting the target application container on a first computing environment, and re-hosting the target application container on a second computing environment, responsively to a determination using the text based processing that the second computing environment poses reduced security risk relative to the first computing environment.

13. The computer implemented method of claim 1, wherein the examining target application container configuration data to identify one or more target container base image referenced in the target application container configuration includes examining target application container configuration data to identify a plurality of target container base images referenced in the target application container, and wherein the script data obtained from the at least one candidate hosting computing environment is defined by script datasets respectively received from respective first and second computing environments of a plurality of candidate hosting computing environments, wherein the method includes iteratively performing the text based processing and the selecting the hosting computing environment, wherein the method includes hosting the target application container on a first computing environment, and re-hosting the target application container on a second computing environment, responsively to a determination using the text based processing that the second computing environment poses reduced security risk relative to the first computing environment, wherein the method includes sending script data request data to each of the plurality of candidate hosting computing environments for return of a plurality of script datasets associated to respective ones of the plurality of target container base images.

14. The computer implemented method of claim 1, wherein the examining target application container configuration data to identify one or more target container base image referenced in the target application container configuration includes examining target application container configuration data to identify a plurality of target container base images referenced in the target application container, and wherein the script data obtained from the at least one candidate hosting computing environment is defined by script datasets respectively received from respective first and second computing environments of a plurality of candidate hosting computing environments, wherein the method includes iteratively performing the text based processing and the selecting the hosting computing environment, wherein the method includes hosting the target application container on a first computing environment, and re-hosting the target application container on a second computing environment, responsively to a determination using the text based processing that the second computing environment poses reduced security risk relative to the first computing environment, wherein the method includes sending script data request data to each of the plurality of candidate hosting computing environments for return of a plurality of script datasets associated to respective ones of the plurality of target container base images, wherein the subjecting script data associated to the one or more target container base image to text based processing for evaluation of security risk associated to the one or more target container base image includes obtaining a set of script datasets defining the script data, and wherein the obtaining includes obtaining script datasets in a restricted set of script dataset classifications, the restricted set of script datasets determined using reinforcement machine learning in which datasets defining script data are removed from an evaluation list in dependence on an effect level criterion.

15. The computer implemented method of claim 1, wherein the examining target application container configuration data to identify one or more target container base image referenced in the target application container configuration includes examining target application container configuration data to identify a plurality of target container base images referenced in the target application container, and wherein the script data obtained from the at least one candidate hosting computing environment is defined by script datasets respectively received from respective first and second computing environments of a plurality of candidate hosting computing environments, wherein the method includes iteratively performing the text based processing and the selecting the hosting computing environment, wherein the method includes hosting the target application container on a first computing environment, and re-hosting the target application container on a second computing environment, responsively to a determination using the text based processing that the second computing environment poses reduced security risk relative to the first computing environment, wherein the method includes sending script data request data to each of the plurality of candidate hosting computing environments for return of a plurality of script datasets associated to respective ones of the plurality of target container base images, wherein the subjecting script data associated to the one or more target container base image to text based processing for evaluation of security risk associated to the one or more target container base image includes obtaining a set of script datasets defining the script data, and wherein the obtaining includes obtaining script datasets in a restricted set of script dataset classifications, the restricted set of script datasets determined using reinforcement machine learning in which datasets defining script data are removed from an evaluation list in dependence on an effect level criterion, wherein the text based processing includes identifying whether a specified text string is included in the script data, and returning a pass fail result in dependence on the identifying.

16. The computer implemented method of claim 1, wherein the examining target application container configuration data to identify one or more target container base image referenced in the target application container configuration includes examining target application container configuration data to identify a plurality of target container base images referenced in the target application container, and wherein the script data obtained from the at least one candidate hosting computing environment is defined by script datasets respectively received from respective first and second computing environments of a plurality of candidate hosting computing environments, wherein the method includes iteratively performing the text based processing and the selecting the hosting computing environment, wherein the method includes hosting the target application container on a first computing environment, and re-hosting the target application container on a second computing environment, responsively to a determination using the text based processing that the second computing environment poses reduced security risk relative to the first computing environment, wherein the method includes sending script data request data to each of the plurality of candidate hosting computing environments for return of a plurality of script datasets associated to respective ones of the plurality of target container base images, wherein the subjecting script data associated to the one or more target container base image to text based processing for evaluation of security risk associated to the one or more target container base image includes obtaining a set of script datasets defining the script data, and wherein the obtaining includes obtaining script datasets in a restricted set of script dataset classifications, the restricted set of script datasets determined using reinforcement machine learning in which datasets defining script data are removed from an evaluation list in dependence on an effect level criterion, wherein the text based processing includes identifying whether a specified text string is included in the script data, returning a pass fail result in dependence on the identifying, and transforming the pass fail result into one or more qualitative security parameter value, the one or more qualitative security parameter value being selected from the group consisting of an exploitability security parameter value, a prevalence security parameter value and an impact parameter value.

17. The computer implemented method of claim 1, wherein the examining target application container configuration data to identify one or more target container base image referenced in the target application container configuration includes examining target application container configuration data to identify a plurality of target container base images referenced in the target application container, and wherein the script data obtained from the at least one candidate hosting computing environment is defined by script datasets respectively received from respective first and second computing environments of a plurality of candidate hosting computing environments, wherein the method includes iteratively performing the text based processing and the selecting the hosting computing environment, wherein the method includes hosting the target application container on a first computing environment, and re-hosting the target application container on a second computing environment, responsively to a determination using the text based processing that the second computing environment poses reduced security risk relative to the first computing environment, wherein the method includes sending script data request data to each of the plurality of candidate hosting computing environments for return of a plurality of script datasets associated to respective ones of the plurality of target container base images, wherein the subjecting script data associated to the one or more target container base image to text based processing for evaluation of security risk associated to the one or more target container base image includes obtaining a set of script datasets defining the script data, and wherein the obtaining includes obtaining script datasets in a restricted set of script dataset classifications, the restricted set of script datasets determined using reinforcement machine learning in which datasets defining script data are removed from an evaluation list in dependence on an effect level criterion, wherein the text based processing includes identifying whether a specified text string is included in the script data, returning a pass fail result associated to a pass fail security test in dependence on the identifying, and transforming the pass fail result into an exploitability security parameter value, and wherein the transforming includes performing online searching of online security literature using text of the pass fail security test.

18. The computer implemented method of claim 1, wherein the examining target application container configuration data to identify one or more target container base image referenced in the target application container configuration includes examining target application container configuration data to identify a plurality of target container base images referenced in the target application container, and wherein the script data obtained from the at least one candidate hosting computing environment is defined by script datasets respectively received from respective first and second computing environments of a plurality of candidate hosting computing environments, wherein the method includes iteratively performing the text based processing and the selecting the hosting computing environment, wherein the method includes hosting the target application container on a first computing environment, and re-hosting the target application container on a second computing environment, responsively to a determination using the text based processing that the second computing environment poses reduced security risk relative to the first computing environment, wherein the method includes sending script data request data to each of the plurality of candidate hosting computing environments for return of a plurality of script datasets associated to respective ones of the plurality of target container base images, wherein the subjecting script data associated to the one or more target container base image to text based processing for evaluation of security risk associated to the one or more target container base image includes obtaining a set of script datasets defining the script data, and wherein the obtaining includes obtaining script datasets in a restricted set of script dataset classifications, the restricted set of script datasets determined using reinforcement machine learning in which datasets defining script data are removed from an evaluation list in dependence on an effect level criterion, wherein the text based processing includes identifying whether a specified text string is included in the script data, returning a pass fail result in dependence on the identifying, and transforming the pass fail result into a plurality of qualitative security parameter value, the plurality of security parameter values including an exploitability security parameter value, a prevalence security parameter value and an impact parameter value, wherein the text based processing includes identifying whether a specified text string is included in the script data, returning a pass fail result associated to a pass fail security test in dependence on the identifying, and transforming the pass fail result into an exploitability security parameter value, and wherein the transforming includes performing online searching of online security literature using text of the pass fail security test.

19. A computer program product comprising:
a computer readable storage medium readable by one or more processing circuit and storing instructions for execution by one or more processor for performing a method comprising:
examining target application container configuration data to identify one or more target container base image referenced in the target application container configuration:
subjecting script data associated to the one or more target container base image to text based processing, wherein the text based processing comprises a text string associated with a confidence level, for evaluation of security risk associated to the one or more target container base image, the script data obtained from at least one candidate hosting computing environment;
selecting a hosting computing environment from the at least one computing environment for hosting a target application container, the selecting in dependence on the text based processing; and
iteratively performing the text based processing for evaluation of security risk and the selecting the hosting computing environment, wherein the method includes hosting the target application container on a first computing environment, and re-hosting the target application container on one or more computing nodes of a computing environment, responsively to a determination using the text based processing that the second computing environment poses reduced security risk relative to the first computing environment.

20. A system comprising: a memory;
at least one processor in communication with the memory; and
program instructions executable by one or more processor via the memory to perform a method comprising:
examining target application container configuration data to identify one or more target container base image referenced in the target application container configuration: subjecting script data associated to the one or more target container base image to text based processing, wherein the text based processing comprises a text string associated with a confidence level, for evaluation of security risk associated to the one or more target container base image, the script data obtained from at least one candidate hosting computing environment;

selecting a hosting computing environment from the at least one computing environment for hosting a target application container, the selecting in dependence on the text based processing;

evaluating a security performance level of one or more target container base image and a target application container; and iteratively performing the text based processing for evaluation of security risk and the selecting the hosting computing environment, wherein the method includes hosting the target application container on a first computing environment, and re-hosting the target application container on a second computing environment having a threshold satisfying the security performance level, responsively to a determination using the text based processing that the second computing environment poses reduced security risk relative to the first computing environment.

* * * * *